(12) United States Patent
Koda et al.

(10) Patent No.: US 9,197,775 B2
(45) Date of Patent: Nov. 24, 2015

(54) IMAGE READING DEVICE, COPIER, AND IMAGE FORMING APPARATUS

(71) Applicant: FUJI XEROX CO., LTD., Tokyo (JP)

(72) Inventors: Kazuyuki Koda, Yokohama (JP); Akira Yamazaki, Yokohama (JP); Tsuyoshi Mabara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/498,154

(22) Filed: Sep. 26, 2014

(65) Prior Publication Data

US 2015/0207941 A1 Jul. 23, 2015

(30) Foreign Application Priority Data

Jan. 23, 2014 (JP) ................................. 2014-010452
Feb. 26, 2014 (JP) ................................. 2014-035320
Mar. 5, 2014 (JP) ................................. 2014-042580

(51) Int. Cl.
*H04N 1/04* (2006.01)
*H04N 1/00* (2006.01)

(52) U.S. Cl.
CPC ........... *H04N 1/0079* (2013.01); *H04N 1/0071* (2013.01); *H04N 1/00702* (2013.01); *H04N 1/00708* (2013.01); *H04N 1/00713* (2013.01); *H04N 1/00779* (2013.01); *H04N 2201/0094* (2013.01)

(58) Field of Classification Search
CPC ............ H04N 1/0079; H04N 1/00708; H04N 1/00702; H04N 1/00779; H04N 1/0071; H04N 1/00713
USPC ................................ 358/3.26, 1.9, 1.13, 1.14
See application file for complete search history.

(56) References Cited

U.S. PATENT DOCUMENTS 8,593,683 B2   11/2013   Ikari
8,665,502 B2 *  3/2014   Masaki ................ G03G 15/607
                                                    271/227
9,001,391 B2 *  4/2015   Masaki ................ G03G 15/607
                                                    358/1.15
2011/0075168 A1  3/2011   Ikari

FOREIGN PATENT DOCUMENTS

JP    A-2010-21832     1/2010
JP    A-2010-206696    9/2010
JP    A-2011-71763     4/2011

* cited by examiner

*Primary Examiner* — Houshang Safaipour
(74) *Attorney, Agent, or Firm* — Oliff PLC

(57) ABSTRACT

An image reading device includes: a placement stage on which document sheets bearing respective images are placed; a pair of guide members that hold the document sheets placed on the placement stage between them and guide a document sheet when it is conveyed, at least one of the pair of guide members being movable in a width direction that is perpendicular to a conveying direction of the document sheets placed on the placement stage; an interval-between-guide-members detecting unit that detects an interval between the pair of guide members; a document sheet conveying unit that conveys the document sheets placed on the placement stage sequentially one by one and thereby causes the document sheets to pass a reading position; a document reading unit as defined herein; a first inclination correction unit as defined herein; and a correction mode switching control unit as defined herein.

21 Claims, 22 Drawing Sheets

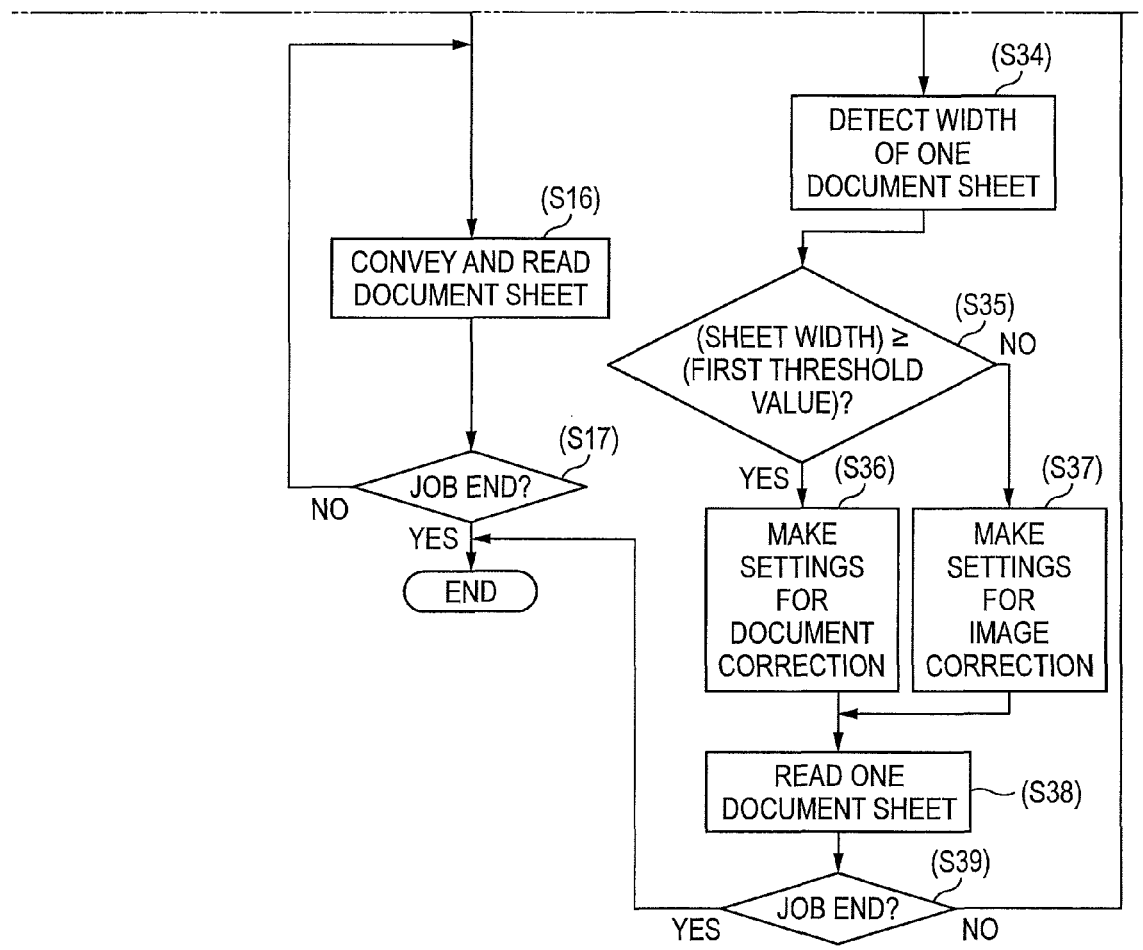

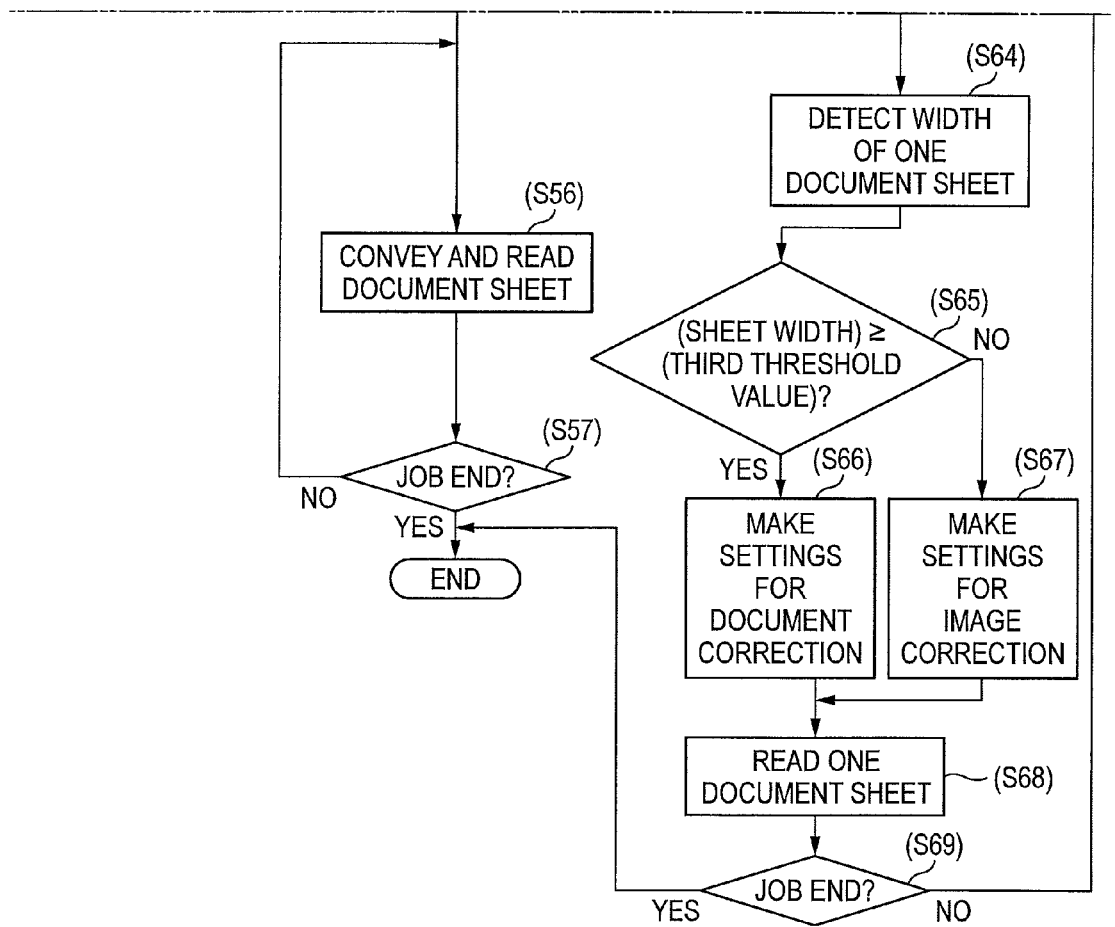

| DOCUMENT SHEET SIZE | | | |
|---|---|---|---|
| LONG | MIXED | REGULAR | IRREGULAR |
| 10° | 10° | 5° | 5° |

| DOCUMENT SHEET SIZE | | | |
|---|---|---|---|
| LONG | MIXED | REGULAR | IRREGULAR |
| 15° | 10° | 5° | 5° |

IMAGE READING DEVICE, COPIER, AND IMAGE FORMING APPARATUS

CROSS-REFERENCE TO RELATED APPLICATIONS

This application is based on and claims priority under 35 USC 119 from Japanese Patent Application No. 2014-010452 filed on Jan. 23, 2014, Japanese Patent Application No. 2014-035320 filed on Feb. 26, 2014 and Japanese Patent Application No. 2014-042580 filed on Mar. 5, 2014.

BACKGROUND

Technical Field

The present invention relates to an image reading device, a copier, and an image forming apparatus.

SUMMARY

According to an aspect of the invention, there is provided an image reading device comprising: a placement stage on which document sheets bearing respective images are placed; a pair of guide members that hold the document sheets placed on the placement stage between them and guide a document sheet when it is conveyed, at least one of the pair of guide members being movable in a width direction that is perpendicular to a conveying direction of the document sheets placed on the placement stage; an interval-between-guide-members detecting unit that detects an interval between the pair of guide members; a document sheet conveying unit that conveys the document sheets placed on the placement stage sequentially one by one and thereby causes the document sheets to pass a reading position; a document reading unit that generates an image signal by reading the image on a document that is passing the reading position; a first inclination correction unit that is disposed upstream of the reading position in the direction of document conveyance by the document sheet conveying unit and corrects inclination of a document sheet brought by conveyance when hit by a front portion of the document sheet; and a correction mode switching control unit that switches to a first inclination correction mode in which the first inclination correction unit operates if the interval between the pair of guide members that are holding the document sheets placed on the placement stage between them is larger than or equal to a predetermined first threshold value, and to a second inclination correction mode in which the first inclination correction unit does not operate if the interval between the pair of guide members is smaller than the first threshold value.

DESCRIPTION OF SYMBOLS

Figure 1:
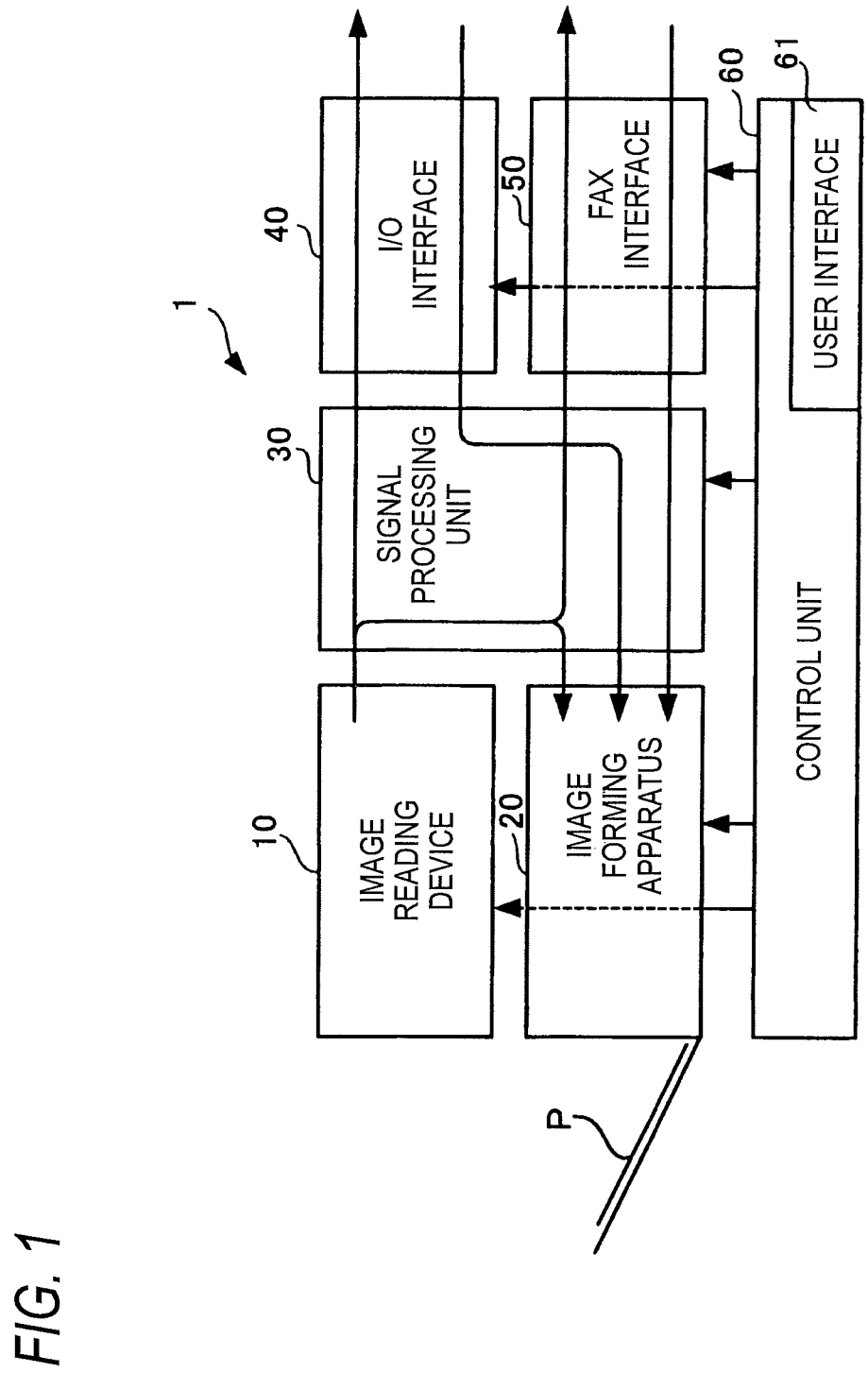
FIG. 1 is a block diagram of a multifunction machine according to an exemplary embodiment of the first aspect of the invention which includes an image reading device and a copier.

1: Multifunction machine
10: Image reading device
11: Document tray
12: Ejected document sheets tray
20: Image forming apparatus
30: Signal processing unit 40: I/O interface
50: FAX interface
60: Control unit
61: User interface
70: Circuit unit
80: Correction mode switching setting picture
91: Long document setting button
117, 117a, 117b: Guide member
118: Document carry-in inlet
119: Openable cover
136: Reading sensor
611: Start button
612: Setting button
613: Touch panel
701a, 702b: Slide arm
702a, 702b: Rack gear arm
710: Pinion gear
721: Light emission/reception sensor
721a: Light-emitting unit
721b: Light-receiving unit
A1: Image forming apparatus
2: Image forming unit
200: Control unit
201: Line buffer
202: Skew correction processing unit
203: Image processing unit
204: Reduction processing unit
205: Edge detection processing unit
206: Angle calculation processing unit
111: First roll
112: Second roll
121, 121a, 121b, 121c: First sensor
122: Second sensor

DETAILED DESCRIPTION

An exemplary embodiment according to the first aspect of the present invention will be described below. FIG. 1 is a block diagram of a multifunction machine according to the exemplary embodiment of the first aspect of the invention which includes an image reading device and a copier. The multifunction machine 1 includes an image reading device 10 and an image forming apparatus 20.

In the image reading device 10, an image signal is generated by reading an image on a document sheet. The image signal is input to a signal processing unit 30 (described later) and subjected various kinds of image processing there. In the image reading device 10, a document sheet bearing a reading subject image is conveyed along a conveyance path including a reading position and the image on the document sheet is read as it passes the reading position. The image reading device 10 corresponds to an example of the image reading device according to the invention (details will be described later).

The image forming apparatus 20 forms an image on a sheet P on the basis of an image signal and ejects the image-formed sheet P. Although in this exemplary embodiment the image forming apparatus 20 is assumed to be of what is called the electrophotographic type, the concept of this exemplary embodiment can also be applied to image forming apparatus of other types such as the inkjet type.

As described later, an image signal of an image to be formed on a sheet P by the image forming apparatus 20 need not always be one obtained by reading an image of a document sheet by the image reading device 10 and may be one that is input externally.

The multifunction machine 1 is equipped with the signal processing unit 30. The signal processing unit 30 performs any of various kinds of signal processing on an image signal that is acquired by the image reading device 10 or input externally according to an operation mode.

The multifunction machine 1 is also equipped with an I/O interface 40 and a FAX interface 50. The I/O interface 40 is in charge of communication between the multifunction machine 1 and an image editing device (not shown) which is typically a computer. The I/O interface 40 receives an image signal generated by the image reading device 10 via the signal processing unit 30 and sends it to the image editing device. In this case, the multifunction machine 1 functions as a scanner. The I/O interface 40 receives an image signal that is sent from the image editing device. The image signal received by the I/O interface 40 is sent to the image forming apparatus 20 via the signal processing unit 30. The image forming apparatus 20 forms an image on a sheet on the basis of the received image signal. In this case, the multifunction machine 1 functions as a printer.

The FAX interface 50 is a module that is connected to a telephone line and is thus in charge of a facsimile function. More specifically, in a FAX transmission mode, the image reading device 10 generates an image signal by reading an image for facsimile transmission on a document sheet. The generated image signal is output to the telephone line via the signal processing unit 30 and the FAX interface 50 and thus transmitted to a destination. In a FAX reception mode, an image signal transmitted over the telephone line is received by the FAX interface 50 and input to the image forming apparatus 20 via the signal processing unit 30. The image forming apparatus 20 prints out an image on a sheet on the basis of the received image signal.

The multifunction machine 1 also has a copying function. In a copy mode, an image signal generated by the image reading device 10 by reading an image on a document sheet is input to the image forming apparatus 20 via the signal processing unit 30. The image forming apparatus 20 prints out an image on a sheet on the basis of the received image signal. This copying function corresponds to an example of the copier according to the first aspect of the invention.

The multifunction machine 1 is also equipped with a control unit 60, which includes a user interface 61. The control unit 60 is in charge of all controls that are necessary in the multifunction machine 1, such as a control for switching between the above-described various functions and modes in accordance with, for example, a user instruction received through the user interface 61.

The signal processing unit 30, the I/O interface 40, the FAX interface 50, and the control unit 60 may be provided in the body of the image reading device 10 or the body of the image forming apparatus 20, or provided in the bodies of the image reading device 10 and the image forming apparatus 20 in a distributed manner. In the multifunction machine 1 according to this exemplary embodiment, as shown in FIG. 2, they are provided in the body of the image forming apparatus 20, with an exception that the user interface 61 is provided in the top surface of the body of the image forming apparatus 20 (see FIG. 3).

Figure 2:
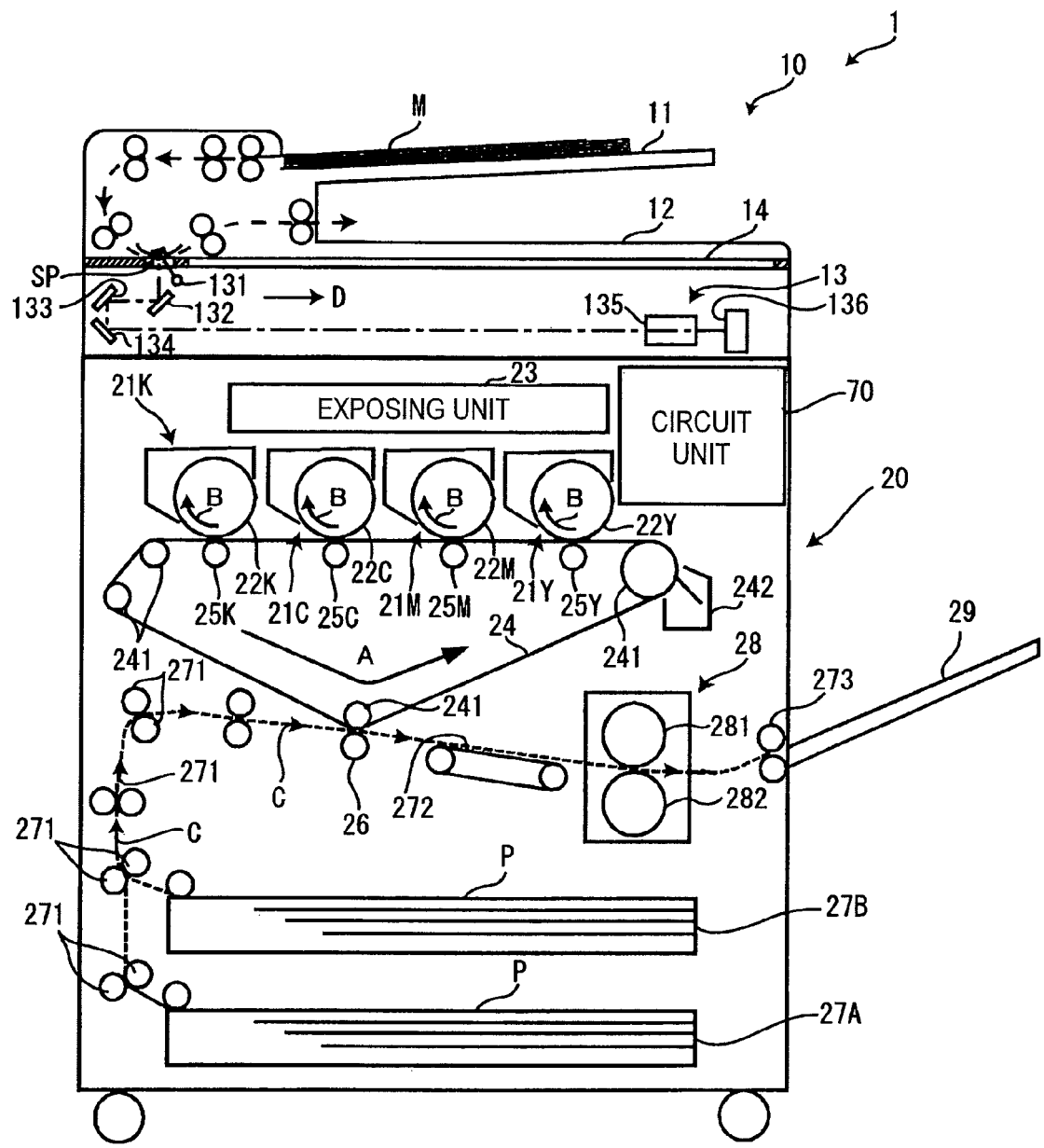
FIG. 2 is a schematic view mainly showing a mechanical configuration of the multifunction machine shown in FIG. 1.

FIG. 2 is a schematic diagram mainly showing a mechanical configuration of the multifunction machine 1 which is shown in FIG. 1 in the form of a block diagram. FIG. 2 shows structures of the image reading device 10 and the image forming apparatus 20 of the multifunction machine 1. In FIG. 2, the other units of the multifunction machine 1, that is, the signal processing unit 30, the I/O interface 40, the FAX interface, 50, and the control unit 60 (see FIG. 1), are drawn together as a single block, that is, a circuit unit 70. The user interface 61 will be described separately with reference to FIG. 3. The image reading device 10 has, as reading modes for reading of an image on a document sheet, a conveyance reading mode and a stationary reading mode.

Figure 3:
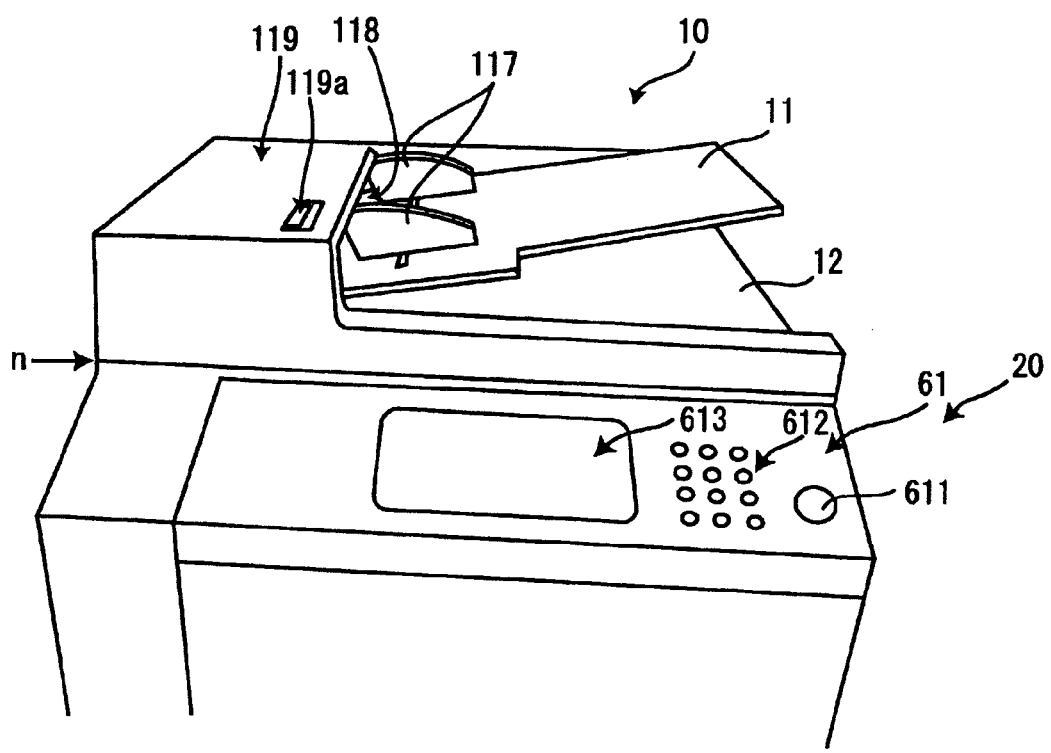
FIG. 3 is a perspective view showing an appearance of a top part of the multifunction machine shown in FIG. 2.

In the conveyance reading mode, document sheets M placed on a document tray 11 are conveyed one by one along a conveyance path (indicated by a broken line in FIG. 3) and passes a reading position SP, the conveyance being initiated by a push of a start button 611 shown in FIG. 3. A portion of an image on each document sheet M is illuminated by a lamp 131 when it passes the reading position SP, resulting reflection light is guided to a reading sensor 136 by reflection mirrors 132, 133, and 134, and a lens 135 which constitute a reading optical system, and read by the reading sensor 136, whereby an image signal is generated. In this exemplary embodiment, the reflection mirrors 132, 133, and 134, and the lens 135 (reading optical system) and the reading sensor 136 constitute a light receiving device 13. A document sheet that has passed the reading position SP is ejected to an ejected document sheets tray 12. Details of a conveying unit for conveying a document sheet M will be described later.

The image reading device 10 is equipped with a transparent glass plate 14 on which a single document sheet M is to be placed. And the image reading device 10 has, on the deep side in the direction that is perpendicular to the paper surface of FIG. 2, a hinge which extends in the left-right direction in FIG. 2. With this structure, a cover unit disposed over the transparent glass plate 14 is lifted up to expose the transparent glass plate 14.

In the stationary reading mode, a user lifts up the cover unit, places a document sheet M face down on the transparent glass plate 14, and has the document sheet M sandwiched between the transparent glass plate 14 and the bottom surface of the ejected document sheets tray 12. When reading is started in this state by a user manipulation, the lamp 131 and the mirrors 132-134 are moved in the direction indicated by arrow D parallel with the bottom surface of the transparent glass plate 14 and an image on the document sheet M is read by the reading sensor 136 and an image signal is generated.

Next, the image forming apparatus 20 will be outlined below, which is of such a type as to form an image on a sheet P by what is called the electrophotographic method.

The image forming apparatus 20 is equipped with image forming units 21K, 21C, 21M, and 21Y which form toner images using toners of respective colors black (K), cyan (C), magenta (M), and yellow (Y). In the following description, if it is not necessary to discriminate between the colors, units or members will be denoted only by a numeral without the suffixes K, C, M, and Y which indicate the colors.

Each image forming unit 21 is equipped with an electrophotographic photoreceptor drum 22 which is rotated in the direction indicated by arrow B. Each photoreceptor drum 22 is charged by a charger (not shown) and illuminated with exposure light coming from an exposing unit 23, whereby an electrostatic latent image is formed on the photoreceptor drum 22. The electrostatic latent image is developed with toner by a developing device (not shown), whereby a toner image of the corresponding color is formed on the photoreceptor drum 22.

An intermediate transfer belt 24 is disposed under the image forming units 21 so as to run parallel with the arrangement of the photoreceptor drums 22, to be stretched by rolls 241, and to circulate in the direction indicated by arrow A. Primary transfer rolls 25 are disposed so as to be opposed to the respective photoreceptor drums 22 with the intermediate transfer belt 24 interposed in between.

Toner images of the respective colors formed on the corresponding photoreceptor drums 22 are transferred sequentially to the intermediate transfer belt 24 so as to be superimposed on each other as the respective primary transfer rolls 25 operate.

Each image forming unit 21 is equipped with a cleaner (not shown) for cleaning a region, as just subjected to transfer, of the corresponding photoreceptor drum 22. Thus, the surface of each photoreceptor drum 22 is cleaned by the associated cleaner.

The image forming apparatus 20 is equipped with a secondary transfer roll 26. The toner images that have been transferred to the intermediate transfer belt 24 so as to be superimposed on each other are transferred to a sheet P that has been conveyed to the position of the secondary transfer roll 26.

Two sheet trays 27A and 27B for housing sheets P are disposed at bottom positions of the image forming apparatus 20. To transfer the toner images to a sheet P, one sheet P is picked up from one of the sheet trays 27A and 27B and conveyed by conveying rolls 271 in the direction indicated by arrow C. The toner images are transferred from the intermediate transfer belt 24 to the sheet P as it passes the position of the secondary transfer roll 26. The sheet P to which the toner images have been transferred is further conveyed by a conveying belt 272 and passes through a fuser 28, which is equipped with a heating roll 281 and a pressing roll 282. The sheet P that has been brought by conveyance and bears the non-fused toner images is sandwiched between the heating roll 281 and the pressing roll 282 and thereby heated and pressed, whereby the non-fused toner images are fused on the sheet P. The sheet P on which an image of the fused toner images has been printed is ejected onto an ejected sheets tray 29 by ejection rolls 273.

The surface region of the intermediate transfer belt 24 from which the toner images have been transferred to the sheet P with operation of the secondary transfer roll 26 is cleaned by a cleaner 242.

FIG. 3 is a perspective view showing an appearance of a top part of the multifunction machine 1 shown in FIG. 2, that is, top parts of the image reading device 10 and the image forming apparatus 20.

FIG. 3 shows the document tray 11 and the ejected document sheets tray 12 of the image reading device 10 (also see FIG. 2). FIG. 3 also shows guide members 117 for guiding document sheets to be conveyed that are placed on the document tray 11 while restricting their positions in the width direction. The document sheets placed on the document tray 11 are restricted in the positions in the width direction and, upon a push of the start button 611 (described later), are carried into the image reading device 10 sequentially one by one through a document carry-in inlet 118 while being guided by the guide members 117.

As described above, the cover unit, above a line n (see FIG. 3), of the image reading device 10 can be lifted up around the axis of hinge which is disposed on the deep side. A document sheet is placed face down on the transparent glass plate 14 (see FIG. 2) with the cover unit lifted up. After the cover unit is lowered (see FIG. 3), the start button 611 is pushed, whereupon the image reading device 10 starts reading of an image on the document sheet in the above-described stationary reading mode.

As shown in FIG. 3, the top surface of the image forming apparatus 20 is provided with the user interface 61 (also see FIG. 1), which includes the above-mentioned start button 611, plural setting buttons 612 including a ten-key unit, and a touch panel 613 which also serves for display.

The image reading device 10 starts reading of a document sheet upon a push of the start button 611. The number of copies, a FAX number of a destination of a FAX transmission, etc. are set using the setting buttons 612. Furthermore, various settings are made through pictures displayed on the touch panel 613.

The document carry-in inlet 118 is covered from above with an openable cover 119 which is opened at the occurrence of a document sheet jam. The openable cover 119 may be configured so as to be opened by lifting it up by hooking fingers on a grip portion 119a which is optional.

The descriptions that have been made above with reference to FIGS. 1-3 are applicable to not only the first aspect of the invention but also a third aspect of the invention.

Figure 4:
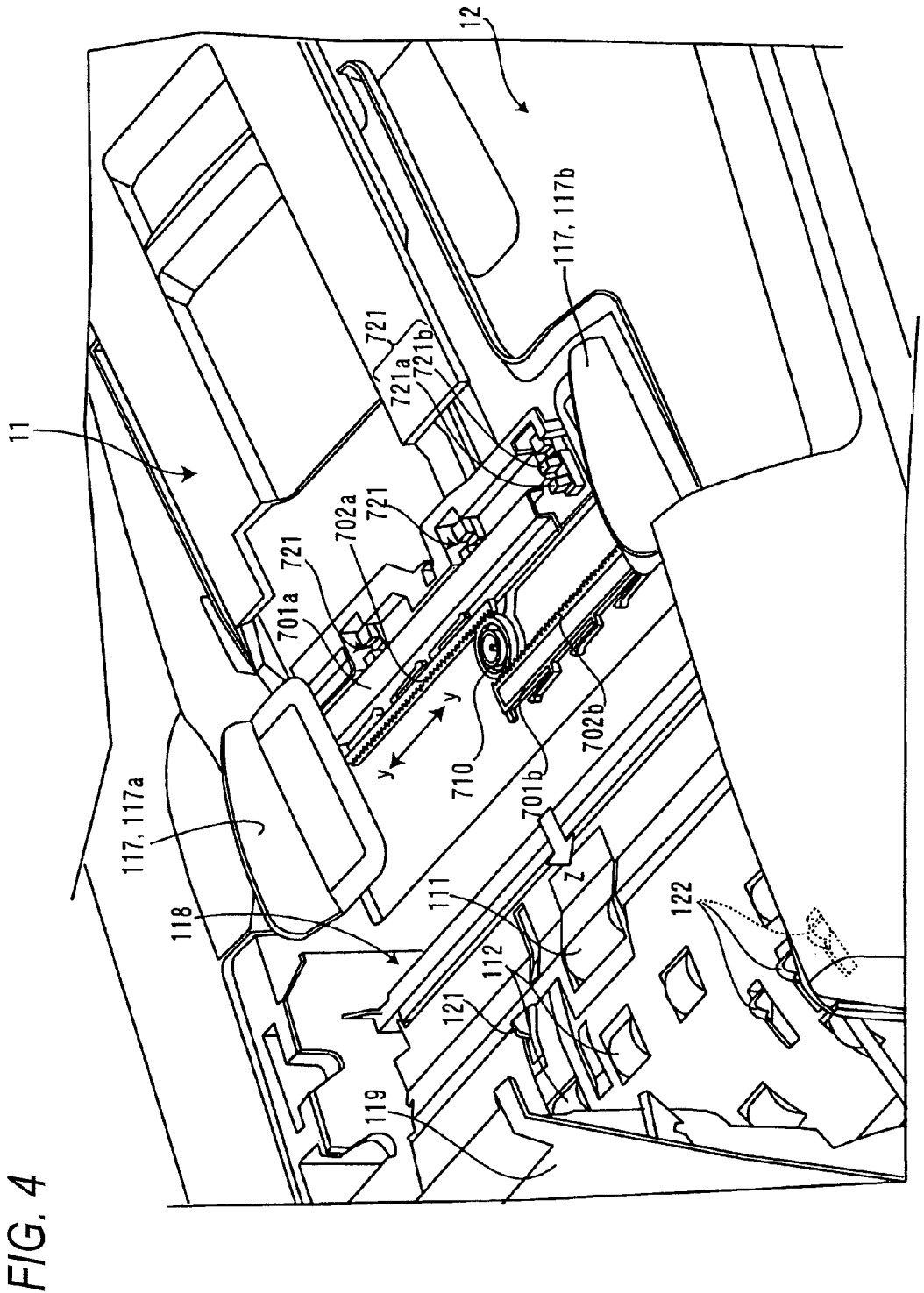
FIG. 4 is a perspective view outlining the internal structure of a top part of a cover unit.

FIG. 4 is a perspective view outlining the internal structure of a top part of the cover unit which is in a state that the openable cover 119 located over the document carry-in inlet 118 (also see FIG. 3) is opened and a top cover of the document tray 11 is removed.

A slide arm 701a and a rack gear arm 702a extend from the guide member 117a (one of the pair of guide members 117) for guiding the right side of document sheets (as viewed downstream in the document conveying direction (indicated by arrow Z)) toward a guide member 117b for guiding the left side of document sheets. The slide arm 701a is a member for assisting a slide of the guide member 117a. Having a rack gear, the rack gear arm 702a is in mesh with a pinion gear 710. The slide arm 701a and the rack gear arm 702a are fixed to each other and fixed to the guide member 117a, and slide together with the guide member 117a in the document width direction (indicated by arrow y-y).

Likewise, a slide arm 701b and a rack gear arm 702b extend from the guide member 117b for guiding the left side of document sheets toward the guide member 117a for guiding the right side of document sheets. The slide arm 701b is a member for assisting a slide of the guide member 117b. Having a rack gear, the rack gear arm 702b is in mesh with the pinion gear 710. The slide arm 701b and the rack gear arm 702b are fixed to each other and fixed to the guide member 117b, and slide together with the guide member 117b in the document width direction (indicated by arrow y-y).

The pinion gear 710 is interposed between the two rack gear arms 702a and 702b and is in mesh with them. Therefore, when one (e.g., guide member 117a) of the two guide members 117a and 117b is slid, the other guide member (e.g., guide member 117b) is moved in the opposite direction. Adjustments have been made so that the two guide members 117a and 117b always slide to positions that are separated from the center of the document tray 11 in its width direction (indicated by arrow y-y) by the same distance. Therefore, when the guide members 117a and 117b are slid so as to press document sheets placed on the document tray 11 from their right side and left side, the position of the document sheets is restricted so as to be located at the center of the document tray 11 in the width direction.

Plural light emission/reception sensors 721 are disposed alongside the slide arm 701a which guides the right side of document sheets. Each light emission/reception sensor 721 consists of a light-emitting unit 721a and a light-receiving unit 721b, and light emitted from the former is received by the latter. If light is interrupted between the light-emitting unit 721a and the light-receiving unit 721b, the interruption is detected.

The slide arm 701a has a bracket-shaped cross section which is open on the bottom side. As the slide arm 701a is slid together with the guide member 117a, the light-emitting units 721a of the light emission/reception sensors 721 go into the inside of the guide member 117a sequentially. That wall of the slide arm 701a which is to be located between the light-emitting units 721a (inside) and the light-receiving units 721b (outside) are formed with openings in such a pattern that the on/off pattern of the light emission/reception sensors 721 varies depending on the slide position of the guide member 117a (i.e., slide arm 701a). A slide position of the guide member 117a is detected on the basis of the on/off pattern of the light emission/reception sensors 721. The slide position of the other guide member 117b is determined by that of the guide member 117a, whereby the interval between them is also determined. This interval coincides with the width of the document sheets placed on the document tray 11. In this manner, a document of the document sheets placed on the document tray 11b in the form of an on/off combination of the light emission/reception sensors 721.

A first roll 111 and a first sensor 121 are disposed immediately downstream of the document carry-in inlet 118 (also see FIG. 3). The first roll 111 is a roll which acts first on the document sheets placed on the document tray 11 to feed them one by one. The first sensor 121 is a sensor which falls down being pushed by a head portion of a document sheet that is fed by the first roll 111 and detects its own falling-down. The first sensor 121 detects that a document sheet has been fed by the first roll 111.

Second rolls 112 are disposed downstream of the first roll 111 and the first sensor 121, and second sensors 122 are disposed downstream of the second rolls 112. The second rolls 112 are rolls for correcting inclination of a document sheet that is fed by the first roll 111 and feeding it further downstream. Each second sensor 122 is a sensor which, like the first sensor 121, falls down being pushed by a head portion of a document sheet that is fed by the first roll 111 and detects its own falling-down. The plural second sensors 122 are arranged in the width direction of document sheets. The second sensors 122 are sensors which not only detect that a document sheet has been conveyed past the second rolls 112 but also detect a width of the document sheet on the basis of which of them have detected the document sheet.

The image reading device 10 of the multifunction machine 1 according to this exemplary embodiment has a size-mixed document mode for reading images on plural document sheets that are placed on the document tray 11 and have plural sizes in mixture. In the size-mixed document mode, the maximum one of the widths of plural stacked document sheets can be detected using the interval between the guide members 117a and 117b. That is, the widths, smaller than the maximum one, of the stacked document sheets cannot be detected using the interval between the guide members 117a and 117b. In view of this, in this exemplary embodiment, a width of each document sheet fed is detected by the second sensors 122.

Figure 5:
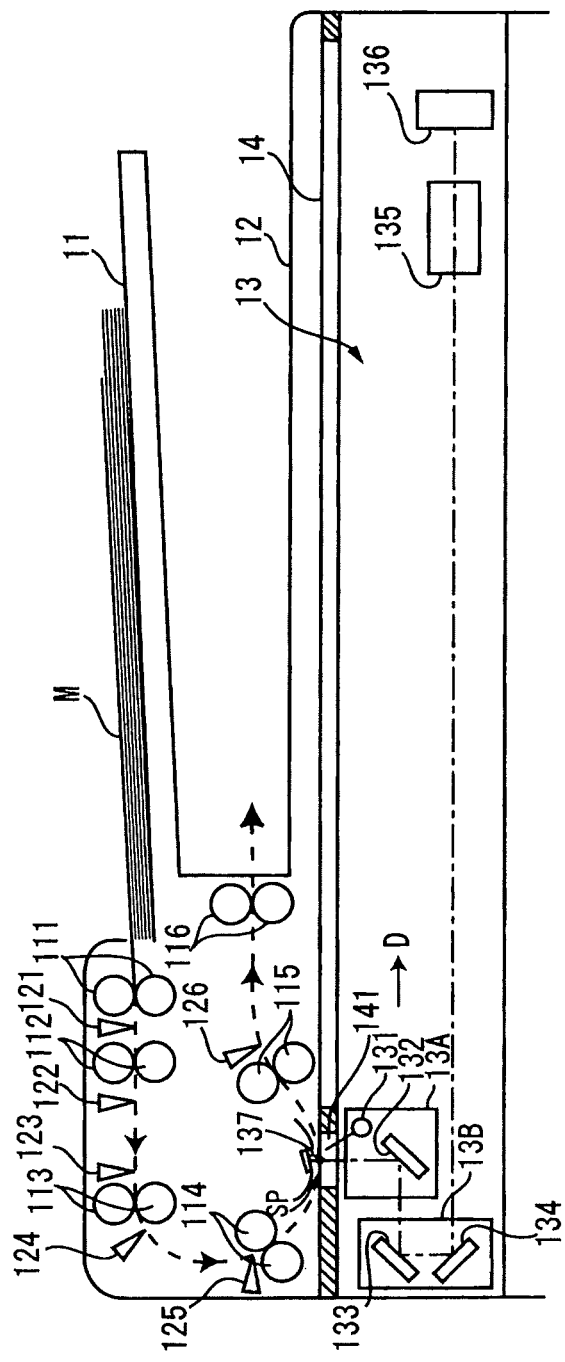
FIG. 5 illustrates how the image reading device shown in FIGS. 1 and 2 operate.

FIG. 5 illustrates how the image reading device 10 shown in FIGS. 1 and 2 operate. Document sheets M placed on the document tray 11 are conveyed one by one along a conveyance path including the reading position SP and ejected onto the ejected document sheets tray 12.

As shown in FIG. 5, a first pair of rolls 111, second pairs of rolls 112, third pairs of rolls 113, fourth pairs of rolls 114, fifth pairs of rolls 115, and sixth pairs of rolls 116 are disposed as conveying members for conveying a document sheet M. The first sensor 121, the second sensors 122, third sensors 123, fourth sensors 124, fifth sensors 125, and sixth sensors 126 are disposed as sensors for detecting presence/absence of a document sheet being conveyed along the conveyance path.

The conveyance path is provided with a function of correcting inclination of a document sheet M. However, when this document inclination correcting function is used, a loud sound is generated unlike when it is not used. Therefore, in the image reading device 10, selection can be made as to whether to use the document inclination correcting function. In this exemplary embodiment, modes in which the document inclination correcting function is used and not used are called a first correction mode and a second correction mode, respectively. The document inclination correcting function will be described below with an assumption that the image reading device 10 is in the first correction mode in which the document inclination correcting function is used.

The first pair of rolls 111 are a pair of rolls for feeding one of plural document sheets M placed on the document tray 11 to the conveyance path. When the head of the document sheet M (that has been fed by the first pair of rolls 111) has just reached the second pairs of rolls 112, the second pairs of rolls 112 are not rotating. Therefore, a head portion of the document sheet M is bent after hitting the second pairs of rolls 112, whereby inclination of the document sheet M is corrected if it has been fed in a state that it is inclined leftward or rightward. Then the second pairs of rolls 112 starts rotating to convey the document sheet M further. The document sheet M hits the third pairs of rolls 113 and is bent again, whereby its inclination is corrected again. The document sheet M is fed further by the third pairs of rolls 113. To prevent the document sheet M from being pulled because of a difference between the rotation speeds of the second pairs of rolls 112 and the third pairs of rolls 113, the document sheet M is conveyed in a state that it is bent to some extent. The document sheet M that has been conveyed by the third pairs of rolls 113 is conveyed further by the fourth pairs of rolls 114 and reaches the reading position SP. At the reading position SP, the document sheet M is conveyed in a state that it is in contact with the top surface of the transparent glass plate 14. After passing the reading position SP, the document sheet M is conveyed further by the fifth pairs of rolls 115 and ejected onto the ejected document sheets tray 12 by the sixth pairs of rolls 116.

At the positions of the first sensor 121 to the sixth sensors 116, whether the document sheet M fed has passed those respective positions is detected, whereby timing of a start of rotation of each set of pairs of rolls, timing of a start of reading by the reading sensor 136, and other things are adjusted on the basis of passage detection results. The timing of a start of reading by the reading sensor 136 should be adjusted strictly particularly in the case where image inclination correction processing (described with reference to FIG. 6) is performed on an image signal; a timing adjustment is performed more precisely than in the case where the document inclination correction processing that has been described above with reference to FIG. 5 is performed, that is, no image inclination correction processing is performed on an image signal.

A reflection member 137 is disposed behind a document sheet M that is passing the reading position SP, that is, at such a position that the document sheet M is interposed between itself and the lamp 131.

When the document sheet M is passing the reading position SP, light that is emitted from the lamp 131 is reflected by the document sheet M. The reflection light shines on the light receiving device 13 and read by the reading sensor 136, whereby an image signal is generated. In this exemplary embodiment, the light receiving device 13 is equipped with the mirrors 132-134, the lens 135, and the reading sensor 136.

The lamp 131 and the first mirror 131 are incorporated in a first carriage 13A, and the second mirror 133 and the third mirror 134 are incorporated in a second carriage 13B.

In the conveyance reading mode which is a mode in which an image on a document sheet M is read at the reading position SP as it fed from the document tray 11 by the first roll 111, the first carriage 13A and the second carriage 13B stay at the fixed positions shown in FIG. 5 and a document sheet M that has been conveyed to the reading position SP is illuminated by the lamp 131 and resulting reflection light is read by the reading sensor 136. On the other hand, in the stationary reading mode, a document sheet M is placed on the transparent glass plate 14 and the first carriage 13A and the second carriage 13B are moved parallel with the bottom surface of the transparent glass plate 14 in the auxiliary scanning direction, that is, in the direction indicated by arrow D. The second carriage 13B is moved at a speed that is half of a movement speed of the first carriage 13A. As a result, the length of the optical path that reflection light that is reflected from the document sheet M travels until reaching the lens 135 is kept constant and an image on the document sheet M is imaged on the reading sensor 136 correctly.

Next, the second correction mode which is employed in this exemplary embodiment will be described. In this exemplary embodiment, image inclination correction processing is performed in the second correction mode. In the image inclination correction processing, an inclination amount of an image represented by an image signal generated by reading a document sheet is calculated on the basis of the generated image signal and a new image signal representing an inclination-corrected image is generated on the basis of the calculated inclination amount.

An image signal that is generated by reading a document sheet includes not only an image of the document sheet but also information indicating boundary lines between the document sheet and a background (reflection member 137) of the document sheet, that is, information indicating edges of the document sheet. In the image inclination correction processing according to this exemplary embodiment, first, front edge of the document sheet in the conveying direction is detected on the basis of the document sheet edge information that is contained in the received image signal. A document inclination amount is then calculated. Finally, the inclination of the image represented by the image signal is corrected and a new image signal representing an inclination-corrected image is generated.

FIGS. 6A-6D illustrate details of the image inclination correction processing. First, a straight line representing the front edge of a document sheet and an inclination angle of the straight line are calculated by Hough transform. Subsequently, the image of the document sheet is rotated by an amount corresponding to the calculated inclination angle on the image signal by rotation processing included in affine transform, whereby a new image signal representing an inclination-less image is generated. Since Hough transform and affine transform are well-known calculation techniques, they will be only outlined below.

Figure 6A:
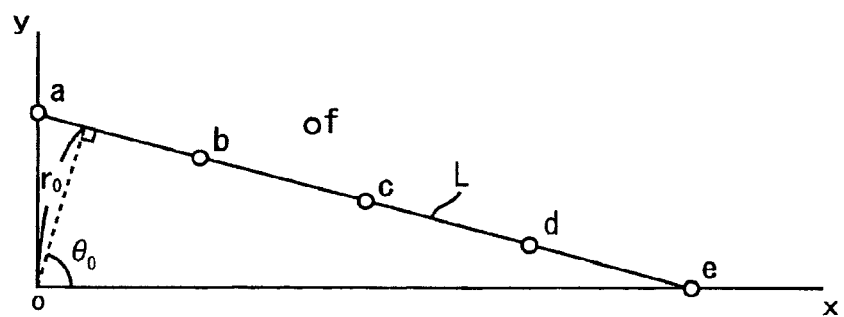
FIGS. 6A, 6B, 6C and 6D illustrate details of image inclination correction processing.
Figure 6B:
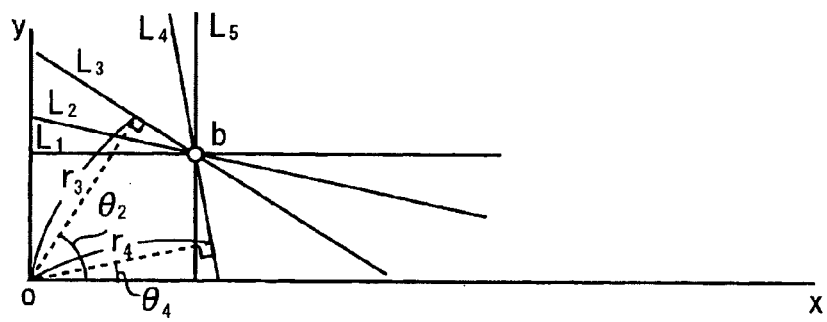
Figure 6C:
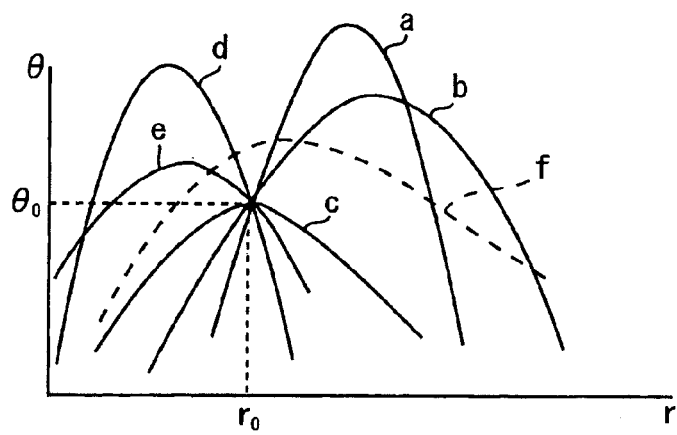

FIGS. 6A-6C illustrate how Hough transform is performed. As described above, a document sheet is conveyed along the conveyance path including the reading position SP. And an image on the document sheet is read when it is passing the reading position SP, whereby an image signal is generated. The image signal contains information indicating edges of the document sheet.

In FIG. 6A, the abscissa x represents the position in the width direction of the document sheet and the ordinate y represents the position in the document sheet conveying direction.

In FIG. 6A, a straight line L represents the front edge of a document sheet. The straight line L is not known yet and is assumed to be a line connecting points a to f have been extracted from an image signal generated as points that appear to be located on the front edge of the document sheet.

Whereas the points a to f include many points (in this example, points a to e) that are actually located on the straight line L which represents the front edge of the document sheet, they also include an error point (e.g., point f).

A straight line is represented by an equation $$r = x \cos\theta + y \sin\theta \tag{1}$$

where r is the length of the perpendicular from the origin O to the straight line and $\theta$ is the inclination angle. The straight line L shown in FIG. 6A is determined uniquely if r and $\theta$ are determined as follows:

$$r = r_0, \theta = \theta_0. \tag{2}$$

Hough transform is a technique for determining $(r, \theta) = (r_0, \theta_0)$.

FIG. 6B shows five straight lines $L_1$ to $L_5$ that are various straight lines passing through one point b shown in FIG. 6A.

The lengths and angles of the perpendiculars to the respective straight lines $L_1$ to $L_5$ are represented by $r_i$ and $\theta_i$, respectively (i=1, 2, ..., 5). FIG. 6B shows lengths $r_3$ and $r_4$ and angles $\theta_3$ and $\theta_4$ of the two straight lines $L_3$ and $L_4$.

FIG. 6C shows a Hough space that is defined by the length of the perpendicular, r (abscissa), and the angle $\theta$ (ordinate). A sinusoidal curve b shown in FIG. 6C is obtained by plotting sets of a length r and an angle $\theta$ of many straight lines passing through point b. This sinusoidal curve b represents the straight lines passing through point b.

FIG. 6C shows curves a to f that are obtained for all the points a to f shown in FIG. 6A in the same manner as curve b and each of which is represented by the length r and the angle $\theta$ of the perpendicular.

Whereas the curves a to e that represent the straight lines passing through the points a to e that are located on the front edge of the document sheet pass through a single point $(r_0, \theta_0)$ in the Hough space, the curve f that represents the straight lines passing through the error point f does not.

As described above, coordinates $(r_0, \theta_0)$ representing a straight line L as shown in FIG. 6A can be determined by extracting, from an image signal, many points that appear to be located on the front edge of a document sheet, calculating many curves as shown in FIG. 6C, and finding a point where the curves concentrate.

Figure 6D:
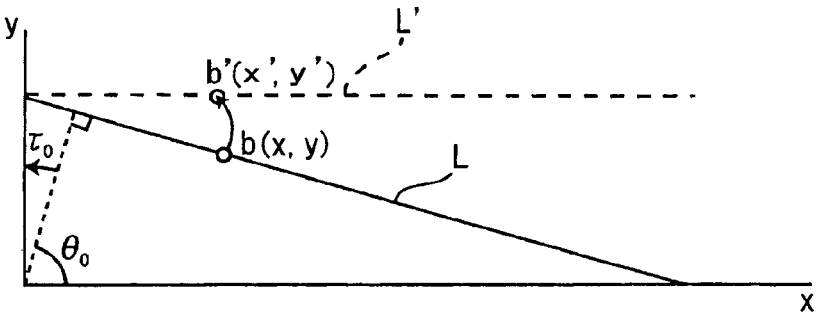

The straight line L representing the front edge of the document sheet has thus been recognized on the basis of the image signal using the above-described Hough transform. FIG. 6D also shows the straight line L representing the front edge of the document sheet.

At this stage, the straight line L has been determined uniquely by the Hough transform that has been described above with reference to FIGS. 6A-6C. That is, the angle $\theta_0$ is determined.

An inclination angle $\tau_0$ of the straight line L, that is, an inclination amount of the document sheet, is now calculated using the angle $\theta_0$ according to the following equation:

$$\tau_0 = 90° - \theta_0. \tag{3}$$

Subsequently, processing of calculating an inclination-less straight line L' by rotating the straight line L is performed. Coordinates (x', y') of a new point b' that is obtained by rotating, by the angle $\tau_0$, a representative point b (x, y) on the straight line L are given by $$x' = x \cos\tau_0 - y \sin\tau_0$$

$$y' = x \sin\tau_0 + y \cos\tau_0. \tag{4}$$

The coordinates of every point constituting the image represented by the image signal are converted according to Equation (4). As a result, the image signal representing the inclined image generated by reading the inclined document sheet is converted into a new image signal representing an image that would be generated if the document sheet were read in a state that it is not inclined.

In this exemplary embodiment, selection is made between the image inclination correction processing just described above and document inclination correction processing which was described with reference to FIG. 5.

Figure 7:
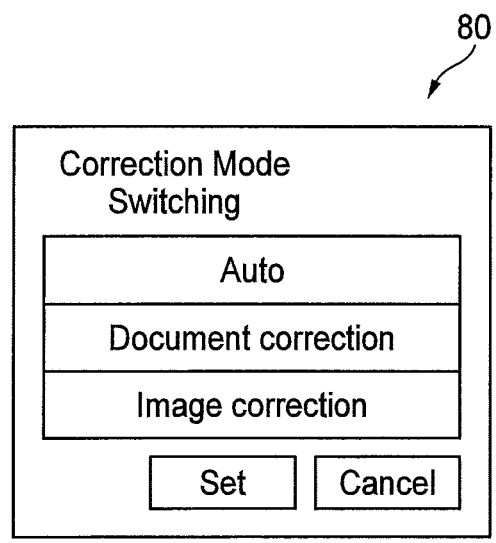
FIG. 7 shows a correction mode switching setting picture.

Next, an image reading operation which is performed in this exemplary embodiment will be described. FIG. 7 shows a correction mode switching setting picture 80 which is displayed on the touch panel 613 (see FIG. 3) in making initial setting manipulations.

Push buttons "auto," "document correction," and "image correction" are arranged in the correction mode switching setting picture 80. A "set" button and a "cancel" button are also displayed. Operations to be performed when the push buttons "document correction" and "image correction" are pushed, respectively, will be described first. An operation to be performed when the button "auto" is pushed will be described later. The push button "document correction" is a push button for setting to the first correction mode in which to mechanically correct inclination of a document sheet being conveyed (described above with reference to FIG. 5). The push button "image correction" is a push button for setting to the second correction mode in which to correct image inclination on the basis of an image signal generated by reading a document sheet (described above with reference to FIGS. 6A-6D). The push button "auto" is a push button for setting to an automatic correction mode in which switching is made between the first correction mode and the second correction mode automatically according to a condition described later.

If the "set" button is pushed after pushing one of the push buttons "auto," "document correction," and "image correction," one, corresponding to the pushed button, of the automatic correction mode, the first correction mode (document correction mode), and the second correction mode (image correction mode) is set and the correction mode switching setting picture 80 disappears from the screen of the touch panel 613. If the "cancel button" is pushed, no new setting is made and the correction mode switching setting picture 80 disappears from the screen of the touch panel 613. The fact that a setting has been made means that it is stored in a storage unit (not shown) which is provided in the circuit unit 70 (see FIG. 2). A preparation for an actual operation is performed separately according to the content stored (described later in detail).

A setting made through the correction mode switching setting picture 80 shown in FIG. 7 is an initial setting, and is kept effective until resetting is made no matter how many jobs have been carried out.

Figure 8:
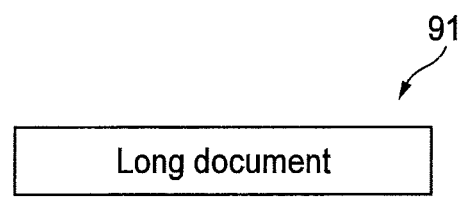
FIG. 8 shows a long document setting button.

FIG. 8 shows a long document setting button 91. A long document mode is set to read document sheets (placed on the document tray 11) whose length in the conveying direction is greater than a predetermined length (e.g., 440 mm). The long document mode is set by pushing the long document setting button 91 shown in FIG. 8 which is displayed on the touch panel 613. Unlike in the case where a correction mode has been set (see FIG. 7), setting to the long document mode needs to be made in advance every time a reading job is carried out. Once a job of reading long document sheets has been completed, the setting of the long document mode is canceled and the reading mode is returned to a mode for reading document sheets having an ordinary size which are shorter than long document sheets.

Although in the above example the long document mode is set by pushing the long document setting button 91 shown in FIG. 8 which is displayed on the touch panel 613, a long document setting button may be provided as one of the setting buttons 612 of the user interface 61 shown in FIG. 3. As a further alternative, a user may be freed of time and labor to set the long document mode by disposing a sensor for detecting placement of long document sheets on the document tray 11.

Figure 9:
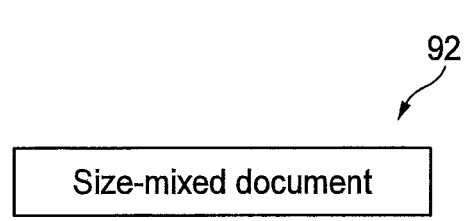
FIG. 9 shows a size-mixed document setting button.

FIG. 9 shows a size-mixed document setting button 92. As described above, in this exemplary embodiment, it is possible to place size-mixed document sheets (i.e., a stack of document sheets having different sizes) on the document tray 11 and read them. To have the image reading device 10 read size-mixed document sheets, a user pushes the size-mixed document setting button 92 shown in FIG. 9 which is displayed on the touch panel 613, whereby a size-mixed document mode is set. As in the case of the long document mode, the size-mixed document mode needs to be set in advance every time a reading job is carried out. Once a job of reading size-mixed document sheets has been completed, the setting of the size-mixed document mode is canceled and the reading mode is returned to a mode for reading a stack of document sheets having the same size.

Although in the above example the size-mixed document mode is set by pushing the size-mixed document setting button 92 (see in FIG. 9) which is displayed on the touch panel 613, as in the case of the long document setting button a physical size-mixed document setting button may be provided as one button of the user interface 61 shown in FIG. 3.

Figure 10:
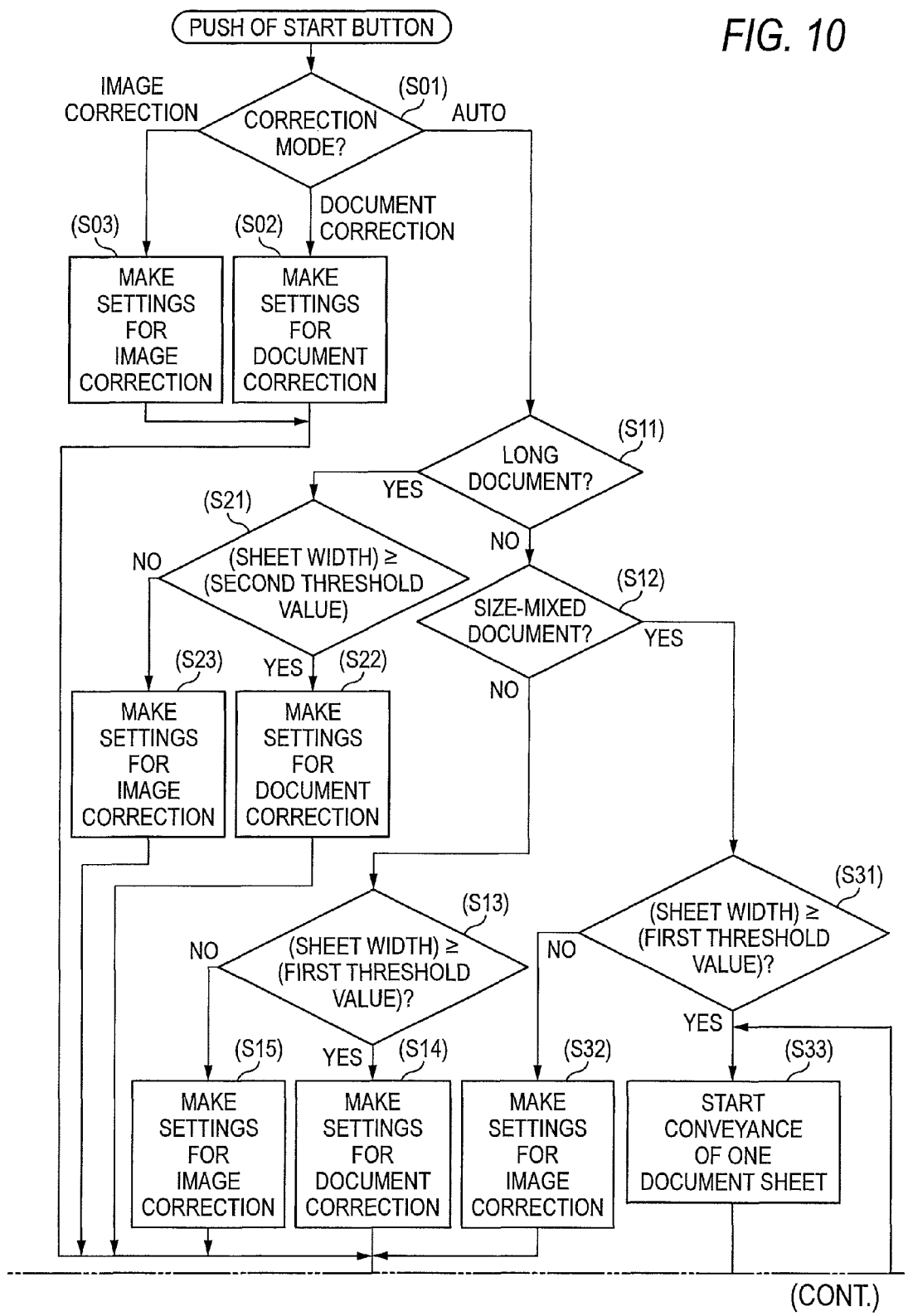
FIG. 10 is a flowchart of a first example process that is executed by the image reading device of the multifunction machine according to the exemplary embodiment of the first aspect of the invention.

FIG. 10 is a flowchart of a first example process that is executed by the image reading device 10 of the multifunction machine 1 according to this exemplary embodiment when the start button 611 shown in FIG. 3 is pushed.

The process shown in FIG. 10 is executed when the start button 611 shown in FIG. 3 is pushed after one or plural document sheets were placed on the document tray 11 and the long document setting button 91 shown in FIG. 8 was pushed (in the case where the document sheets placed are long document sheets) or the size-mixed document setting button 92 shown in FIG. 9 was pushed (in the case where the document sheets placed are size-mixed document sheets). It is also assumed that one of the automatic correction mode, the first correction mode (document correction mode), and the second correction mode (image correction mode) has already been set as an initial setting through the correction switching setting picture 80 shown in FIG. 7.

Upon a start of the process shown in FIG. 10, first, at step S01, it is judged whether the correction mode is set to the automatic correction mode, the document correction mode, or the image correction mode. As mentioned above, the fact that a setting has been made by a user manipulation through the correction switching setting picture 80 means that the setting is stored internally. If the document correction mode is set (stored), at step S02 settings for document inclination correction according to the first correction mode in which document inclination itself is corrected (described above with reference to FIG. 5) are made. On the other hand, if it is judged at step S01 that the image correction mode is set, at step S03 settings for image inclination correction according to the second correction mode in which image inclination is corrected on the basis of an image signal generated by reading (described above with reference to FIGS. 6A-6D) are made. The settings for document inclination correction that are made at step S02 and the settings for image inclination correction that are made at step S03 each mean a specific preparation for an actual inclination correcting operation. This also applies to the following description.

After the execution of step S02 or S03, the process moves to step S16, where document sheets are conveyed and read sequentially one by one while a document inclination correction or an image inclination correction is performed according to the set correction mode until completion of the current job (step S17).

If it is judged at step S01 that the automatic correction mode is set (stored), then it is judged at step S11 whether the current document sheets are long document sheets. At step S12 it is judged whether the current document sheets are size-mixed document sheets. If the current document sheets are neither long document sheets nor size-mixed document sheets, that is, the current document sheets have an ordinary size and are identical in size, then it is judged at step S13 whether the width of the current document sheets is greater than or equal to a first threshold value (e.g., A3SEF (short edge feed)) on the basis of an interval between the pair of guide members 117 (see FIGS. 3 and 4). The SEF of A3 sheets is 297 mm. Therefore, in this exemplary embodiment, the width of document sheets is greater than or equal to the first threshold value in the case where A3 document sheets are fed with their longer edges set parallel with the conveying direction or A4 document sheets are fed with their shorter edges set parallel with the conveying direction. The width of document sheets is smaller than the first threshold value in the case where A4 document sheets are fed with their longer edges set parallel with the conveying direction.

If it is judged at step S13 that the width of the current document sheets is greater than or equal to the first threshold value, settings for document inclination correction are made at step S14. On the other hand, if it is judged at step S13 that the width of the current document sheets is smaller the first threshold value, settings for image inclination correction are made at step S15. After the execution of step S14 or S15, as in the above-described cases, the process moves to step S16, where document sheets are conveyed and read sequentially one by one while a document inclination correction or an image inclination correction is performed according to the set correction mode until completion of the current job (step S17).

When a document inclination correction is performed, an operation for causing a head portion of a document sheet to hit the rolls is performed repeatedly while the rolls are rotating or not rotating (described above with reference to FIG. 5), a loud noise occurs during reading of the document sheet unlike when no document inclination correction is performed. On the other hand, in the case of an image inclination correction, whereas reading of a document sheet is accompanied by only a small sound, inclination of the document sheet may cause a problem that part of the document sheet cannot be read or part of an image signal generated by reading the document sheet cannot be stored in the memory, as a result of which image inclination cannot be corrected or part of an image is lost. Such a problem tends to occur when a document sheet is wide for the reading width of the reading sensor 136, the memory capacity, or the like.

In view of this, in this exemplary embodiment, a width of a document sheet is detected on the basis of the interval between the guide members 117 and an image inclination correction with silent conveyance of the document sheet is performed if the width of the document sheet is smaller than the first threshold value. If the width of the document sheet is greater than or equal to the first threshold value, to perform an inclination correction reliably and prevent loss of part of an image, a document inclination correction is performed with a judgment that generation of a loud noise is unavoidable.

If it is judged at step S11 that the document sheets of the current job are long document sheets, the process moves to step S21, where it is judged whether the width of the document sheets is greater than a second threshold value on the basis of the interval between the guide members 117. The second threshold value is set at a value (e.g., between B5SEF and A4SEF) that is smaller than the first threshold value which is used at step S13. In the case of long document sheets, for a certain inclination angle, a large lateral deviation, and hence, loss of part of an image, tends to occur between its front edge and rear edge in the conveying direction. In view of this, at step S21 a judgment is made using the second threshold value which is smaller than the first threshold value.

If it is judged at step S21 that the width of the document sheet is greater than or equal to the second threshold value, settings for document inclination correction are made at step S22. On the other hand, if it is judged at step S21 that the width of the document sheet is smaller than the second threshold value, settings for image inclination correction are made at step S23. After the execution of step S22 or S23, as in the above-described cases, the process moves to step S16, where the document sheets are conveyed and read sequentially one by one while a document inclination correction or an image inclination correction is performed according to the set correction mode until completion of the current job (step S17).

If it is judged at step S12 that the current document sheets are size-mixed document sheets, the process moves to step S31, where, as at step S13, it is judged whether the widths of the document sheets are greater than or equal to the first threshold value on the basis of the interval between the guide members 117. If it is judged on the basis of the interval between the guide members 117 that the widths of the document sheets are smaller than the first threshold value, it means that the widths of all the document sheets including the maximum width are smaller than the first threshold value though the current job is handling size-mixed document sheets. Therefore, in this case, settings for image inclination correction are made at step S32. After the execution of step S32, the process moves to step S16, where the document sheets are conveyed and read sequentially one by one while an image inclination correction is performed according to the set image correction mode until completion of the current job (step S17).

If the document sheets of the current job are size-mixed document sheets (S12: yes) and the widths of the document sheets as judged on the basis of the interval between the guide members 117 are greater than the first threshold value (S31: yes), conveyance of one document sheet is started at step S33. At step S34, the document sheet width is detected again. This time, however, a width of the one document sheet fed is detected by the second sensors 122. This is because since the reading mode is the size-mixed document mode, the width of the one document sheet that has been fed actually is not necessarily greater than or equal to the first threshold value even if the interval between the guide members 117 is greater than or equal to the first threshold value (S31: yes).

If it is judged at step S35 that the width of the width of the one document sheet fed this time is greater than or equal to the first threshold value, settings for document inclination correction is made at step S36. On the other hand, if it is judged that the width of the width of the one document sheet fed this time is smaller than the first threshold value, settings for image inclination correction is made at step S37. After the execution of step S36 or S37, the process moves to step S38, where the one document sheet is read. If it is judged at step S39 that the one document sheet thus read is the last document sheet of the current job, the reading process of the current job is finished. If the current job still has a document sheet(s) to be read, the process returns to step S33, where conveyance of the next one document sheet is started.

As described above, if the reading mode is the size-mixed document mode and document sheets include ones whose widths are greater than or equal to the first threshold value, switching is made between the document inclination correction and the image inclination correction in accordance with the width of each of the document sheets.

Figure 11:
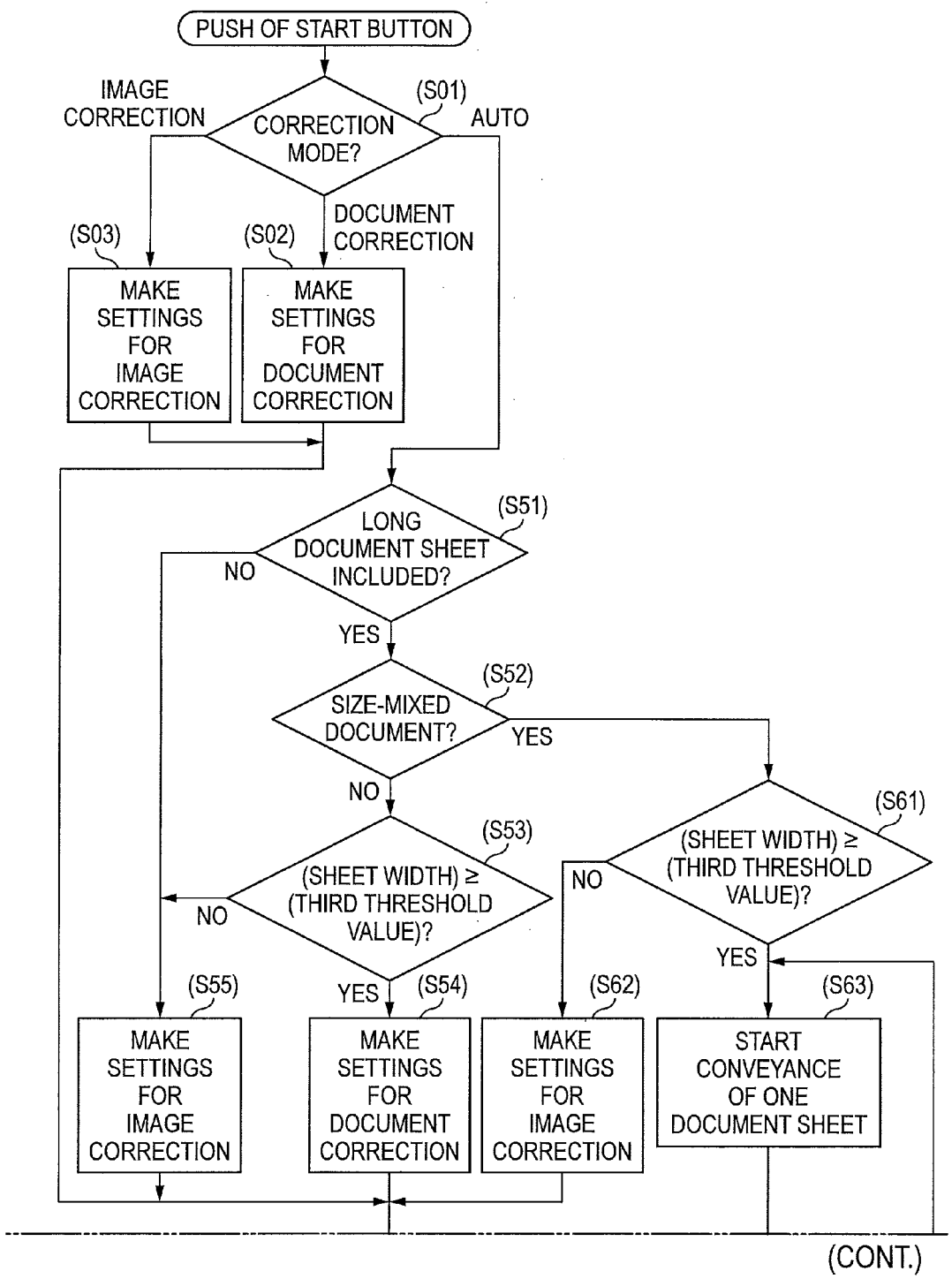
FIG. 11 is a flowchart of a second example process that is executed by the image reading device according to the exemplary embodiment of the first aspect of the invention.

FIG. 11 is a flowchart of a second example process that is executed by the image reading device 10 when the start button 611 shown in FIG. 3 is pushed.

As in the first example process, it is assumed that correction mode setting (see FIG. 7), setting as to whether the current job is to handle long document sheets (see FIG. 8), and setting as to whether the current job is to handle size-mixed document sheets (see FIG. 9) have been made as initial settings. In the case of the first example process shown in FIG. 10, a setting to the effect that long document sheets are going to be read and a setting to the effect that size-mixed document sheets are going to be read are made independently before execution of the process. Furthermore, size-mixed document sheets including long document sheets are not taken into consideration. In contrast, in case of the second example process shown in FIG. 11, size-mixed document sheets including long document sheets are taken into consideration. Furthermore, before execution of the second example process shown in FIG. 11, a setting to the effect that size-mixed document sheets are going to be read can be made only when a setting to the effect that long document sheets is going to be read has been made. The process shown in FIG. 11, rather than the process shown in FIG. 10, is executed as soon as the start button 611 is pushed after making those settings.

Unlike the first example process shown in FIG. 10, the second example process shown in FIG. 11 is intended for a case that the image reading device 10 has large margins in the reading width in the document sheet main scanning direction (width direction) and the capacity of the memory for storing an image produced by reading a document sheet. Unlike the first example process shown in FIG. 10, the second example process shown in FIG. 11 can also be employed in a case that though the image reading device 10 does not have large margins in the reading width and the memory capacity, these margins are increased relatively by employing, as a threshold value for a judgment for switching between document inclination correction and image inclination correction (i.e., a third threshold value shown in FIG. 11), a value (e.g., between B5SEF and A4SEF) that is smaller than the first threshold value used in the first example process of FIG. 10. The second example process shown in FIG. 11 is directed to the case that the image reading device 10 has large margins in the reading width and the memory capacity. Therefore, the second example process shown in FIG. 11 employs the third threshold value that has the same value as the first threshold value that is employed in the first example process shown in FIG. 10.

Step S01 is executed upon a push of the start button 611. Steps S01-S03 are the same as in the first example process shown in FIG. 10 and hence will not be described below redundantly.

At step S51, it is judged whether the current document sheets include long document sheets. If the current document sheets do not include long document sheets, irrespective of whether the current document sheets are size-mixed document sheets the process moves to step S55, where settings for image inclination correction. That is, the image sensor 136 of the image reading device 10 has such a reading width as to be able to read a document sheet having a maximum width among document sheets that are set as reading subjects is conveyed with a maximum inclination within an expected range and its memory has such a capacity as to allow an image inclination correction to be performed correctly on the basis of an image produced by such a reading operation, in the case where the current document sheets do not include long document sheets.

If it is judged at step S51 that the current document sheets include long document sheets, then it is judged at step S52 whether the current document sheets are size-mixed document sheets. If the current document sheets are judged to include long document sheets (S51: yes) and not to be size-mixed document sheets (S52: no), the process moves to step S53. Steps S53-S57 are the same as steps S13-S17 of the first example process shown in FIG. 10 except that step S53 uses the third threshold value as a judgment reference, and hence will not be described redundantly. The meaning of the third threshold value has also been described above and hence will not be described redundantly, either.

If the current document sheets are judged to include long document sheets (S51: yes) and to be size-mixed document sheets (S52: yes), the process moves to step S61. Steps S61-S69 are the same as steps S31-S39 of the first example process shown in FIG. 10 except that steps S61 and S65 use the third threshold value as a judgment reference, and hence will not be described redundantly.

That is, in the second example process shown in FIG. 11 which assumes that the document sheet reading width, the memory capacity, etc. are suitable for it, the correction mode is fixed to the image correction mode if the current document sheets do not include long document sheets and switching is made between the document correction mode and the image correction mode according to the document sheet width only if the current document sheets include long document sheets.

Although the example processes which are executed by the image reading device 10 have been described above, the destination of an image signal generated through reading by the image reading device 10 is irrelevant. The image signal may be sent to the image forming apparatus 20 and used for formation of a copied image, facsimile-transmitted via the FAX interface 50 (see FIG. 1), or sent to a personal computer via the I/O interface 40 (see FIG. 1).

Although this exemplary embodiment is directed to the case that the long document mode is provided, the first aspect of the invention can also be applied to image reading devices in which long document sheets are not read or no setting to the effect that long document sheets are going to be read is made. In this case, steps S21-S23 of the first example process shown in FIG. 10 are omitted and the second example process shown in FIG. 11 is not employed.

Although this exemplary embodiment is directed to the case that the size-mixed document mode is provided, the first aspect of the invention can also be applied to image reading devices in which size-mixed document sheets are not read. In this case, steps S12 and S31-S39 shown in FIG. 10 and steps S52 and S61-S69 of the process shown in FIG. 11 are omitted.

Furthermore, the multifunction machine including the example image reading device and the example copier according to the first aspect of the invention have been described above, the first aspect of the invention can also be applied to single-function image reading devices and copiers.

Exemplary embodiments according to the second aspect of the present invention will be described below.

Exemplary Embodiment 1

Figure 12:
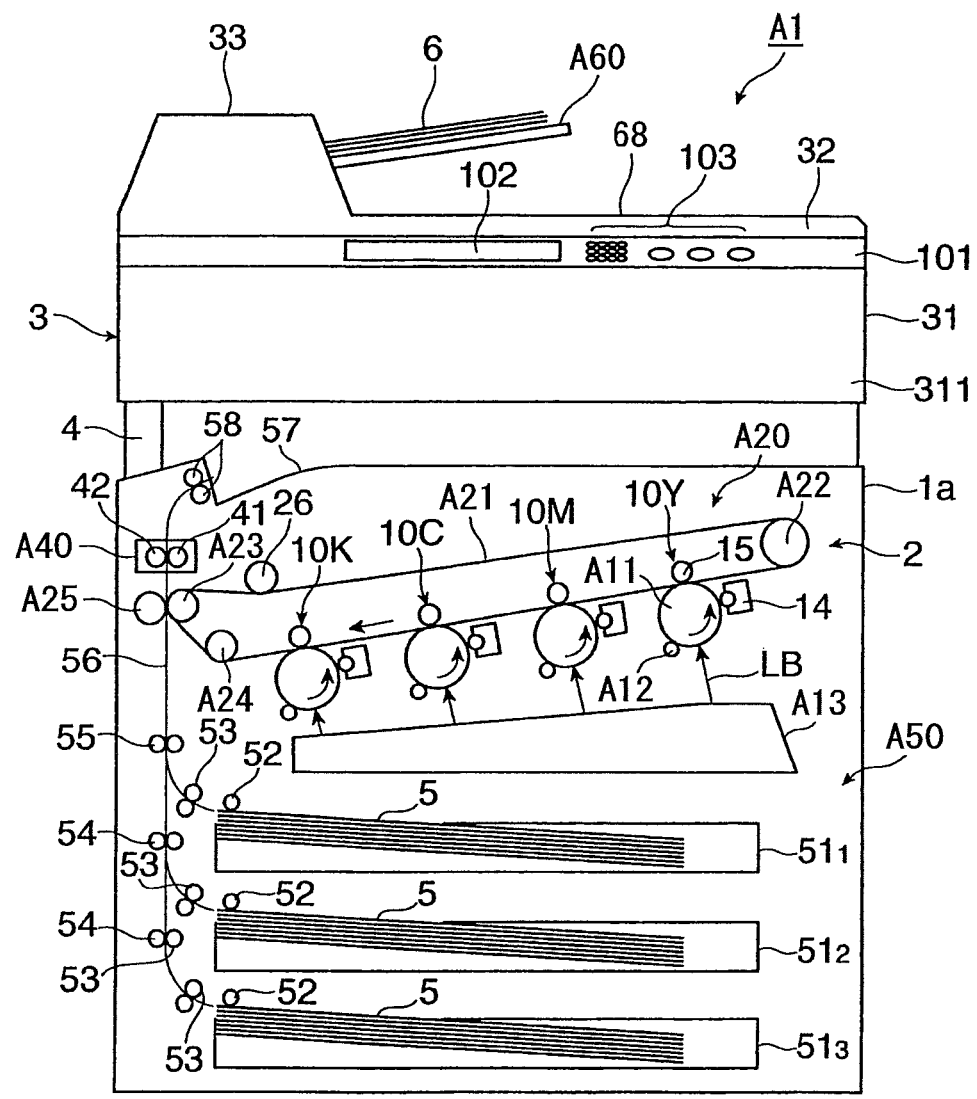
FIG. 12 is a schematic diagram outlining the overall configuration of an image forming apparatus including an image reading device according to a first exemplary embodiment of the second aspect of the invention.

FIG. 12 is a schematic diagram outlining the overall configuration of an image forming apparatus A1 including an image reading device 3 according to a first exemplary embodiment of the second aspect of the invention.

<Overall Configuration of Image Forming Apparatus>

The image forming apparatus A1 according to the first exemplary embodiment is equipped with the image reading device 3 for reading an image on a document sheet 6 and an image forming unit 2 which is an example image forming means for forming an image over a recording medium on the basis of image data. The image reading device 3 is disposed on an apparatus main body 1a (which houses the image forming unit 2) so as to be supported by a support structure 4. A space for ejecting a recording medium is formed between the image reading device 3 and the apparatus main body 1a.

A control panel 101 which is a manipulation unit for manipulating the image forming apparatus A1 is provided in a top portion of a front wall 311 of a body 31 of the image reading device 3. The control panel 101 not only serves as a display unit for displaying a menu, a warning, a message, etc. to a user but also has a touch panel 102 and plural manipulation buttons 103 for receiving, for example, various settings that relate to a displayed manipulation menu. As described later, the touch panel 102 of the control panel 101 also has a function of a stopping means.

The image forming unit 2 is equipped with plural image producing devices 10 for forming toner images through development with toners (developers), an intermediate transfer device A20 for bearing toner images formed by the respective image producing devices 10 and finally conveying them to a secondary transfer position where they are transferred secondarily to a recording sheet 5 (example recording medium), a sheet supply device A50 for housing and feeding prescribed recording sheets 5 to be supplied to the secondary transfer position, a fusing device A40 for fusing, on the recording sheet 5, the toner images that have been transferred secondarily by the intermediate transfer device A20, and other devices. The apparatus main body 1a is composed of support structural members, an exterior cover, etc.

The image producing devices 10 are four image producing devices 10Y, 10M, 10C, and 10K for forming toner images of four colors, that is, yellow (Y), magenta (M), cyan (C), and black (K), respectively. The four image producing devices 10Y, 10M, 10C, and 10K are arranged in line in the internal space of the apparatus main body 1a.

As shown in FIG. 12, the image producing devices 10Y, 10M, 10C, and 10K are equipped with respective photoreceptor drums A11 which are example rotary image holding bodies. Main devices that are disposed around each photoreceptor drum A11 are a charging device A12 for charging the circumferential surface (an image holding surface on which an image can be formed) of the photoreceptor drum A11, an exposing device A13 which is an electrostatic latent image forming means for forming an electrostatic latent image of the corresponding color having potential differences by illuminating the circumferential surface charged by the charging device A12 with light LB that reflects image information (signal), a developing device A14 (Y, M, C, or K) which is a developing means for developing the electrostatic latent image into a toner image with a toner (developer) of the corresponding color Y, M, C, or K, a primary transfer device 15 for transferring the toner image to the intermediate transfer device A20, and a drum cleaning device (not shown) for cleaning the image holding surface of the photoreceptor drum A11 after the primary transfer by removing substances such as toner remaining on (sticking to) the image holding surface.

As shown in FIG. 12, the intermediate transfer device A20 is disposed over the image producing devices 10Y, 10M, 10C, and 10K. The intermediate transfer device A20 is mainly composed of an intermediate transfer belt A21 which is rotated in the direction indicated by an arrow so as to pass through the primary transfer positions between the photoreceptor drums A11 and the primary transfer devices (primary transfer rolls) 15, plural belt support rolls A22, A23, and A24 for supporting the intermediate transfer belt A21 rotatably from inside so as to keep it in a desired state, a secondary transfer device A25 which is disposed on the side of the outer circumferential surface (image holding surface) of the intermediate transfer belt A21 supported by the belt support rolls A22, A23, and A24 and serves to transfer toner images on the intermediate transfer belt A21 secondarily to a recording sheet 5, and a belt cleaning device 26 for cleaning that portion of the outer circumferential surface of the intermediate transfer belt A21 which has passed the secondary transfer device A25 by removing substances such as toners and sheet powder remaining on (sticking to) the portion of the outer circumferential surface.

As shown in FIG. 12, the secondary transfer device A25 is a contact transfer device having a secondary transfer roll which is supplied with a secondary transfer voltage and rotated being in contact with the outer circumferential surface of the intermediate transfer belt A21 at the secondary transfer position on the outer circumferential surface of the intermediate transfer belt A21 where it is supported by the belt supply roll A23. A DC voltage having the same or opposite polarity as or to the toner charging polarity is supplied, as a secondary transfer voltage, to the secondary transfer device (roll) A25 or the support roll A23 of the intermediate transfer device A20.

The fusing device A40 is mainly composed of a roll or belt-shaped heating rotary body 41 which is heated by a heating means so that its surface temperature is kept at a predetermined temperature and a roll or belt-shaped pressing rotary body 42 which is rotated being in contact with the heating rotary body 41 with a prescribed pressure. In the fusing device A40, the contact portion where the heating rotary body 41 and the pressing rotary body 42 are in contact with each other serves as a fusing processing portion where prescribed fusing processing (heating and pressing) is performed.

The sheet supply device A50 is disposed under the exposing device A13. The sheet supply device A50 is mainly composed of plural (or single) sheet housing bodies $51_1$, $51_2$, and $51_3$ which house stacks of recording sheets 5 having desired sizes, types, etc. and feeding devices 52 and 53 for feeding recording sheets 5 from the sheet housing bodies $51_1$, $51_2$, and $51_3$ one by one. For example, the sheet housing bodies $51_1$, $51_2$, and $51_3$ are attached so as to be able to be pulled out of the apparatus main body 1a to its front side (i.e., the side from which a user faces the image forming apparatus A1 in using it).

The sheet conveying passage 56 which is composed of plural sheet conveying rolls 54 and 55 for conveying a recording sheet 5 fed from the sheet supply device A50 to the secondary transfer position and conveyance guide members. For example, the sheet conveying rolls 55 which are disposed immediately upstream of the secondary transfer position in the sheet conveying passage 56 are rolls (registration rolls) for adjusting conveyance timing of a recording sheet 5. Furthermore, ejection rolls 58 for ejecting a recording sheet 5 to an ejected sheets housing unit 57 are disposed downstream of the fusing device A40 in the sheet conveying direction.

<Basic Operation of Image Forming Apparatus>

A description will be made of an image forming operation that is performed when a full-color image is formed as a combination of toner images of the four colors (Y, M, C, and K) using the four image producing devices 10Y, 10M, 10C, and 10K.

When the image forming apparatus A1 receives instruction information of a request for an image forming operation (printing), the four image producing devices 10Y, 10M, 10C, and 10K, the intermediate transfer device A20, the secondary transfer device A25, the fusing device A40, etc. are activated.

In each of the image producing devices 10Y, 10M, 10C, and 10K, first, the photoreceptor drum A11 is rotated in the direction indicated by an arrow and the charging device A12 charges the surface of the photoreceptor drum A11 to a prescribed potential of a prescribed polarity (in this exemplary embodiment, negative polarity). Then the exposing device A13 illuminates the charged surface of the photoreceptor drum A11 with light LB that reflects an image signal obtained by converting image information that is input to or generated in the image forming apparatus A1 into a component of the corresponding one of the colors Y, M, C, and K and thereby forms an electrostatic latent image of the corresponding color which has prescribed potential differences.

Then the developing device 14 (Y, M, C, or K) develops the electrostatic latent image of the corresponding color Y, M, C, or K formed on the photoreceptor drum A11 by supplying it with toner of the corresponding color Y, M, C, or K that is charged in the prescribed polarity (negative polarity) and thereby sticking the toner to the electrostatic latent image. As a result, the electrostatic latent image of the corresponding color Y, M, C, or K formed on the photoreceptor drum A11 is visualized as a toner image of the corresponding color Y, M, C, or K.

The toner images of the respective colors that are formed on the photoreceptor drums A11 of the respective image producing devices 10Y, 10M, 10C, are 10K are then carried to the respective primary transfer positions and transferred primarily in turn to the intermediate transfer belt A21, rotating in the direction indicated by the arrow, of the intermediate transfer device A20 so as to be superimposed on each other.

In each primary-transfer-completed image producing device 10, the drum cleaning device (not shown) cleans the surface of the photoreceptor drum A11 after the primary transfer by removing substances such as toner remaining on the surface by scraping them off. Thus, each image producing device 10 is restored to a state that it can perform the next image forming operation.

Subsequently, in the intermediate transfer device A20, the rotating intermediate transfer belt A21 holds the primarily transferred toner images and conveys them to the secondary transfer position. On the other hand, the sheet supply device A50 feeds a prescribed recording sheet 5 to the sheet conveying passage 56 in synchronism with the image forming operation. The sheet conveying rolls 55 (registration rolls) of the sheet conveying passage 56 feed the recording sheet to the secondary transfer position with timing that is suitable for the transfer of the toner images.

At the secondary transfer position, the secondary transfer device A25 secondarily transfers the toner images on the intermediate transfer belt A21 together to the recording sheet 5. In the secondarily-transfer-completed intermediate transfer device A20, the belt cleaning device 26 cleans the surface of the intermediate transfer belt A21 by removing substances such as toners remaining on the secondarily-transfer-completed portion of the surface.

The recording sheet 5 bearing the secondarily transferred toner images is peeled off the secondary transfer device A25 and conveyed to the fusing device A40. The fusing device A40 fuses the unfused toner images on the recording sheet 5 by performing necessary fusing processing (heating and pressing). Finally, the fusing-completed recording sheet 5 is ejected to the ejected sheets housing unit 57 which is located, for example, inside the apparatus main body 1*a* by the ejection rolls 58.

With the above operation, the recording sheet 5 on which a full-color image is formed as a combination of the toner images of the four colors is output.

<Configuration of Image Reading Device>

Figure 13:
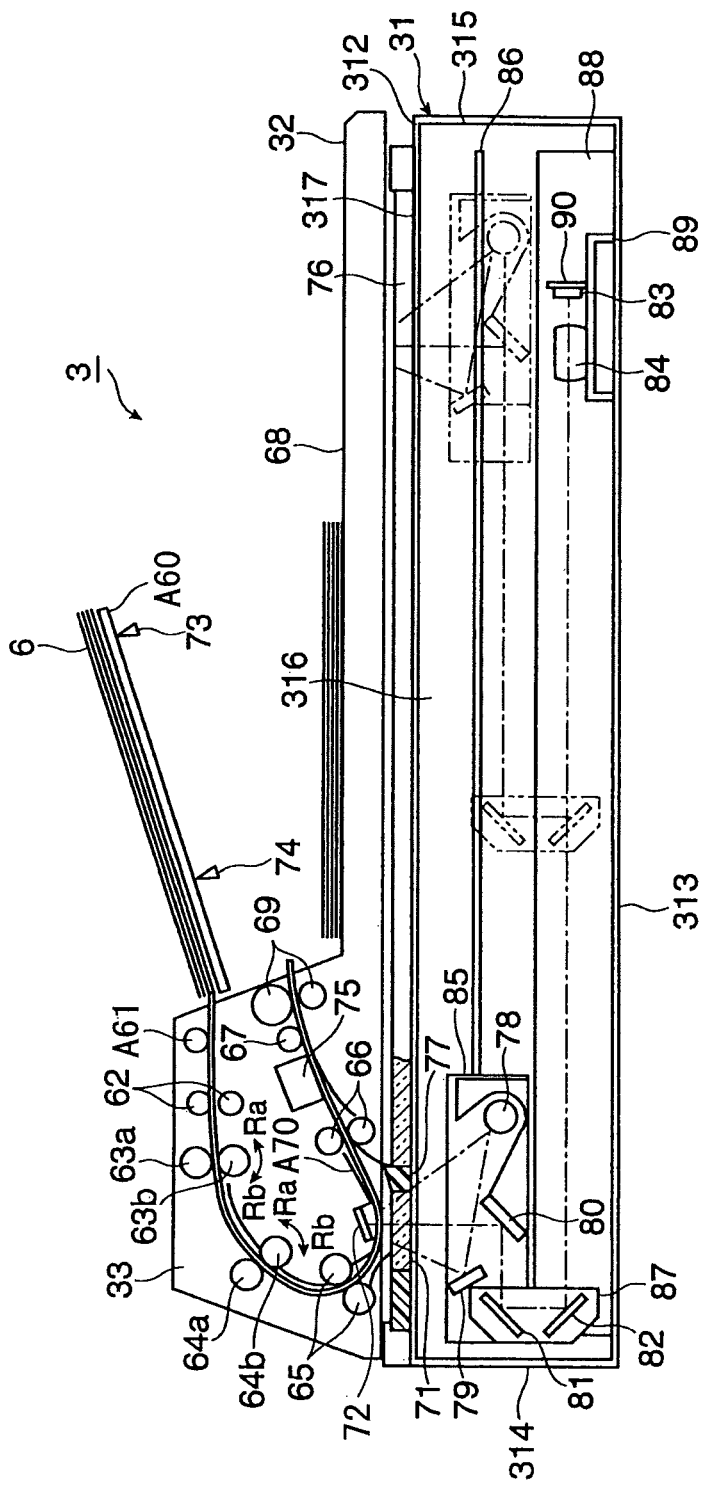
FIG. 13 is a schematic diagram showing the configuration of the image reading device according to the first exemplary embodiment of the second aspect of the invention.

FIG. 13 is a schematic diagram showing the configuration of the image reading device 3 according to this exemplary embodiment. The image reading device 3 is generally equipped with a body 31 whose top surface is formed with a document reading surface, a document pressing cover 32 which is attached to the body 31 in an openable manner, and an automatic document feeding unit 33 which is one end portion of the document pressing cover 32.

The image reading device 3 is configured in such a manner that switching can be made between a first reading mode in which a document sheet 6 is read while being conveyed automatically by the automatic document feeding unit 33 and a second reading mode in which a document sheet 6 placed on a document stage 76 (described later) is read. FIG. 13 shows how individual members are set during a document reading operation in the first reading mode.

The automatic document feeding unit 33 is equipped with a document sheets housing unit A60 which is set in a state that document sheets 6 are stacked thereon and a document feeding mechanism which is composed of a feeding roll A61 for feeding document sheets 6 from the document sheets housing unit A60, a pair of separation rolls 62 for separating the document sheets 6 fed by the feeding roll A61 into individual ones, and conveying rolls 63-67 for conveying a document sheet 6 to a document reading position. The feeding roll A61, the pair of separation rolls 62, and conveying rolls 63-67 are driven by a driving means (not shown) when a document sheet 6 is read. The pair of conveying rolls 65 function as registration rolls, and the pair of conveying rolls 64*a* and 64*b* which are disposed upstream of the pair of conveying rolls 65 in the conveying direction function as pre-registration rolls. The conveying roll 67 is a roll for pressing the top surface of a document sheet 6.

The pair of conveying rolls 63*a* and 63*b* and the pair of conveying rolls 64*a* and 64*b* which are arranged along the document sheet conveying direction function as a first inclination correcting means for mechanically correcting inclination of a document sheet 6 from the conveying direction. Of the pair of conveying rolls 63*a* and 63*b* which are disposed at an upstream position in the document sheet conveying direction, as shown in FIG. 13 the conveying roll 63*b* which is a drive roll can be rotated in both of a normal rotation direction Ra and a reverse rotation direction Rb being driven by the driving means such as a drive motor (not shown). The conveying roll 63*a* which is a follower roll is rotated following rotation of the conveying roll 63*b* in a state that conveying roll 63*a* is pressed against the conveying roll 63*b*. The conveying roll 63*a* is thus rotated in the opposite direction to the rotation direction of the conveying roll 63*b*.

Likewise, of the pair of conveying rolls 64*a* and 64*b* which are disposed at a downstream position in the document sheet conveying direction, as shown in FIG. 13 the conveying roll 64*b* which is a drive roll can be rotated in both of a normal rotation direction Ra and a reverse rotation direction Rb being driven by the driving means such as a drive motor (not shown). The conveying roll 64*a* which is a follower roll is rotated following rotation of the conveying roll 64*b* in a state that conveying roll 64*a* is pressed against the conveying roll 64*b*. The conveying roll 64*a* is thus rotated in the opposite direction to the rotation direction of the conveying roll 64*b*.

The pair of conveying rolls 63*a* and 63*b* perform inclination correction (hereinafter also referred to as "skew correction") on a document sheet 6 being conveyed so that it becomes oriented in the document conveying direction by bending it by causing its head to hit the pair of conveying rolls 64*a* and 64*b* which are disposed downstream of the pair of conveying rolls 63*a* and 63*b* and are not rotating, and thus serve as part of the mechanical first inclination correcting means. Likewise, the pair of conveying rolls 64*a* and 64*b* perform skew correction on a document sheet 6 being conveyed so that it becomes oriented in the document conveying direction by bending it by causing its head to hit the pair of conveying rolls 65 which are disposed downstream of the pair of conveying rolls 64*a* and 64*b* and are not rotating, and thus serve as part of the mechanical first inclination correcting means.

Controlled by a control unit 200 (described later), the pair of conveying rolls 63*a* and 63*b* and the pair of conveying rolls 64*a* and 64*b* performs a mechanical inclination correction only when necessary. Therefore, usually, the conveying rolls 63*b* and 64*b* are rotated in the normal rotation direction. It is not always necessary to correct skew of a document sheet 6 in two stages using both of the pair of conveying rolls 63*a* and 63*b* and the pair of conveying rolls 64*a* and 64*b*. That is, the image reading device 3 may be configured so as to correct skew of a document sheet 6 using only one of the pair of conveying rolls 63*a* and 63*b* and the pair of conveying rolls 64*a* and 64*b*.

The automatic document feeding unit 33 is also equipped with curved reading guides A70 for guiding a document sheet 6 to the reading position and guiding it so that it travels toward the ejection side from the reading position, a plate-like specular reflection plate 72 which is disposed over a reading window 71, is attached to part of the reading guides A70, and serves as a back support for a document sheet, a first sensor 73 which is an example detecting means for detecting a size of document sheets 6 in the auxiliary scanning direction, a second sensor 74 which is an example detecting means for detecting a size of the document sheets 6 in the main scanning direction, and a back surface reading unit 75 for reading an image on the back surface of a document sheet when necessary.

The specular reflection plate 72 serves to reflect light that is emitted from an illumination lamp 78 (described later) at such reflectivity that resulting reflection light has light intensity that is equal to upper limit (white upper limit) light intensity that can be detected by an image reading element 83. For example, the specular reflection plate 72 may be a mirror-finished metal plate, a film plate produced by silver or aluminum evaporation, or a sheet made of a metal such as aluminum.

The body 31 of the image reading device 3 is a rectangular-parallelepiped-shaped box whose top wall 312 is opened partially. The body 31 has the top wall 312 which is opposed to the document pressing cover 32, a bottom wall 313 which is opposed to the top wall 312, side walls 341 and 315 which are located on the two respective sides of the bottom wall 313 and opposed to each other in the auxiliary scanning direction (the left-right direction in FIG. 13), the above-mentioned front wall 311 (see FIG. 12), and a rear wall 316 which is opposed to the front wall 311 in the main scanning direction (the direction perpendicular to the paper surface of FIG. 13).

An opening 317 is formed through the top wall 312 of the body 31 in an area corresponding to an area where a document sheet 6 is read in the second reading mode. The opening 317 is provided with a document stage (platen glass) 76 for supporting a document sheet 6. A reading window 71 through which to read a document sheet 6 in the first reading mode is formed on the side of the automatic document feeding unit 33 side of the document stage 76. A guide member 77 for guiding a document sheet 6 in the first reading mode is provided between the reading window 71 and the document stage 76.

The image reading device 3 is equipped with, inside the body 31, a cylindrical illumination lamp 78 for emitting light for illumination of a document sheet 6, a reflector 79 as a reflection member for reflecting part of the light emitted from the illumination lamp 78, a first mirror 80 for receiving reflecting light coming from the document sheet 6, a second mirror 81 for receiving reflection light coming from the first mirror 80, a third mirror 82 for receiving reflection light coming from the second mirror 81, and an image reading unit which has the image reading element 83 such as a CCD, a lens 84 for imaging reflection light coming from the third mirror 82 on the image reading element 83, and other elements. The illumination lamp 78, the reflector 79, and the first to third mirrors 80-82 extend in the main scanning direction (the direction perpendicular to the paper surface of FIG. 13). The illumination lamp 78 emits light toward the specular reflection plate 72 and the reflector 79.

The illumination lamp 78, the reflector 79, and the first mirror 80 are fixed to a first movable body 85 which is a carriage which extends in the main scanning direction and is provided so as to be movable in the auxiliary scanning direction. As the first movable body 85 is moved in the auxiliary scanning direction being guided by a first rail 86 which is attached to the rear wall 316 of the body 31 so as to extend in the auxiliary scanning direction, the illumination lamp 78 illuminates a reading subject area of a document sheet 6 and first mirror 80 reflects reflection light coming from the document sheet 6 toward the second mirror 81 which is fixed to a second movable body 87.

The second mirror 81 and the third mirror 82 are fixed to the second movable body 87 which is a carriage which extends in the main scanning direction and is provided so as to be movable in the auxiliary scanning direction. As the second movable body 87 is moved in the auxiliary scanning direction being guided by a second rail 88 which is attached to the bottom wall 313 of the body 31 so as to extend in the auxiliary scanning direction, the third mirror 82 reflects, toward the lens 84 of the image reading unit, reflection light that is originally reflected from the document sheet 6. The one first rail 86 and the one second rail 88 are disposed on the two respective ends in the main scanning direction so as to be opposed to each other.

The image reading unit also has a board 90 which is mounted with the image reading element 83 and fixed to a base plate 89 which is supported by the bottom wall 313. The image reading unit is configured so that reflection light coming from the third mirror 82 and passing through the lens 84 is imaged on the image reading element 83 such as a CCD and the image reading element 83 reads the image of the document sheet 6. Thus, the image reading unit outputs resulting image data.

The image reading device 3 is configured so that in the second reading mode the movement distance of the second movable body 87 is made half of that of the first movable body 85 as they are moved in the auxiliary scanning direction being driven by a drive mechanism (not shown) so that the optical path length from the image reading position on a document sheet 6 to the image reading element 83 does not vary. In FIG. 13, positions of the first movable body 85 and the second movable body 87 in a state that first movable body 85 has moved to a position close to the end of a document sheet 6 in the auxiliary scanning direction are indicated by two-dot chain lines.

Figure 14:
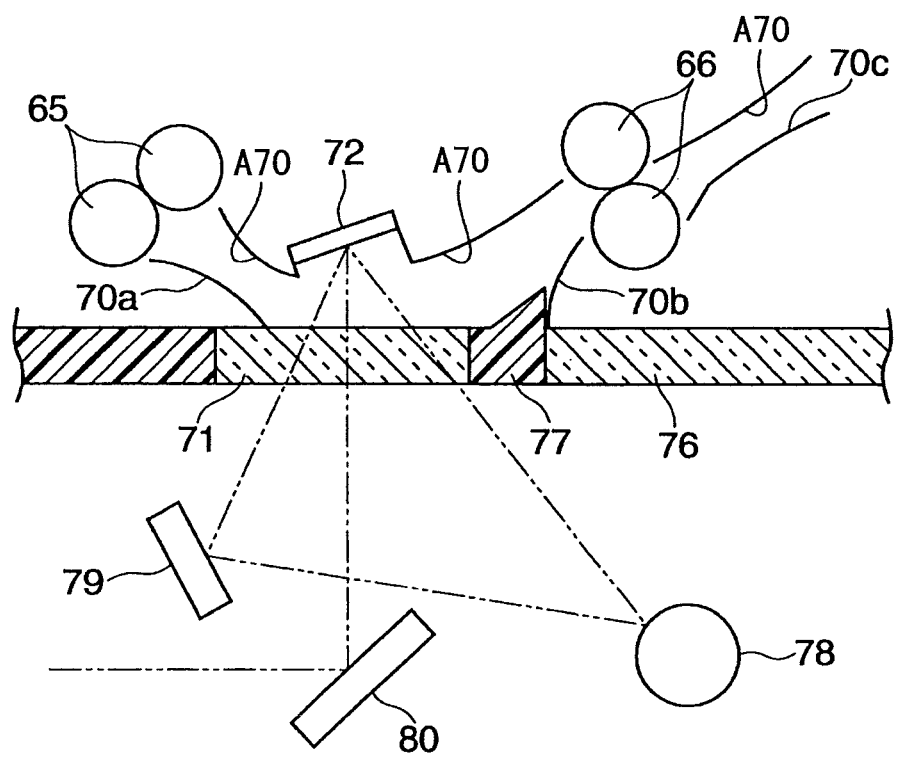
FIG. 14 is a sectional view showing the configuration of an essential part of the image reading device according to the first exemplary embodiment of the second aspect of the invention.

FIG. 14 is a sectional view showing the configuration of a part, around the document reading position of the first reading mode, of the image reading device 3. In FIG. 14, an optical path of light that is emitted from the illumination lamp 78 and shines on a document 6 is indicated by a two-dot chain line. Reading guides 70a, 70b, and 70c are disposed on the outer circumferential side of the reading guides A70 and guides, together with the reading guides A70, a document sheet 6 being conveyed by the pairs of conveying rolls 65 and 66.

The angles, positions, etc. of a light guide body and a light diffusion plate (not shown) for the illumination lamp 78 are adjusted so that part of light emitted from the illumination lamp 78 directly reaches the document reading position and the other part shines on the reflector 79. The angle, position, etc. of the reflector 79 are adjusted so that it reflects the part of light coming from the illumination lamp 78 toward the document reading position.

The angles, positions, etc. of the first mirror 80, the second mirror 81, and the third mirror 82 are adjusted so that when a portion of a document sheet 6 exists at the document reading position, light reflected from the portion of the document sheet 6 reaches the image reading unit.

The angle, position, etc. of the specular reflection plate 72 are adjusted so that when no portion of a document sheet 6 exists at the document reading position, it reflects light that is emitted from the illumination lamp 78 and reaches the document reading position directly is reflected toward the first mirror 80.

In this exemplary embodiment, a specular reflection surface is formed by disposing the specular reflection plate 72 which is an aluminum sheet is disposed by sticking it at an attachment position. If necessary, wax is applied to the surfaces of the specular reflection plate 72 and the reading guides A70 so that foreign substances such as sheet powder, dust, etc. are less prone to stick to them. Such foreign substances as sheet powder tend to be produced in such a manner that a document sheet 6 comes into contact with the corner portions of the reading guides A70 when the document sheet 6 runs being guided by the reading guides A70. Therefore, applying wax also to the reading guides A70 is more effective at suppressing production of sheet powder than applying wax only to the specular reflection plate 72.

<Configuration of Control Unit>

Figure 15:
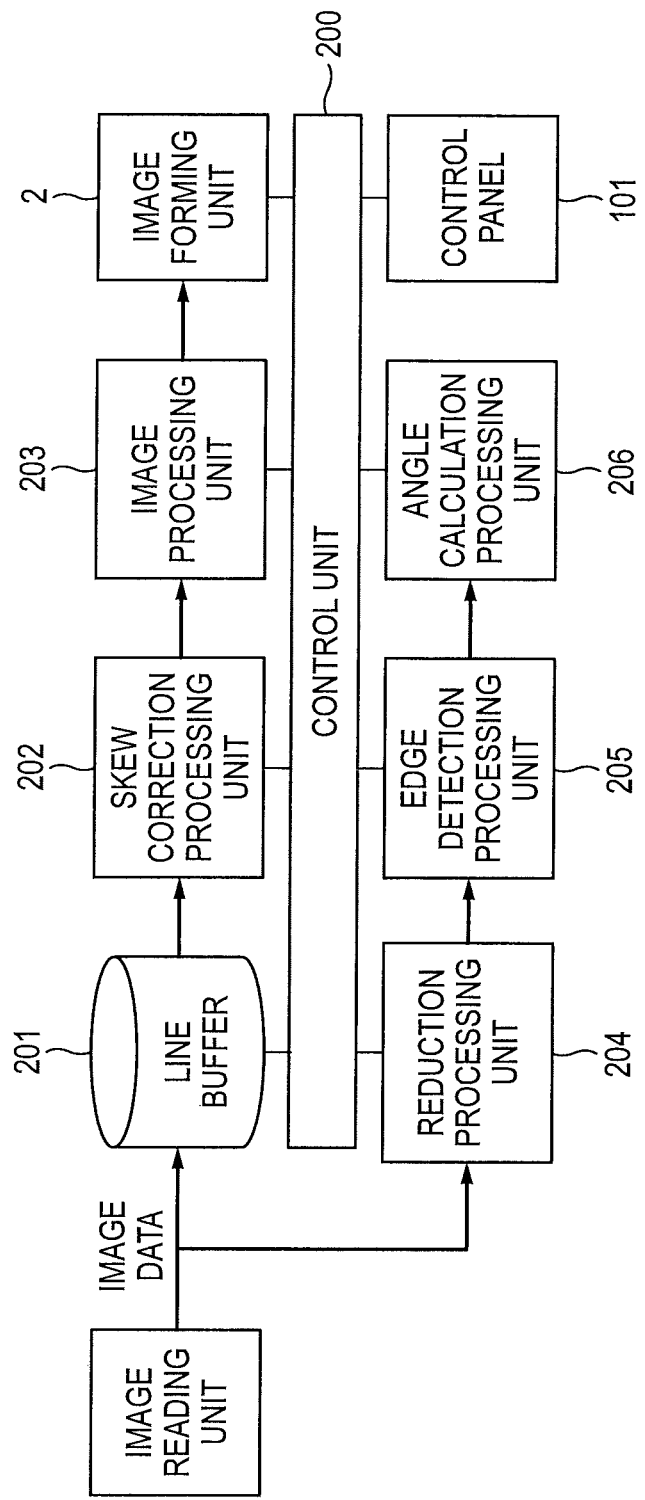
FIG. 15 is a block diagram of the control unit of the image reading device according to the first exemplary embodiment of the second aspect of the invention.

FIG. 15 is a block diagram of the control unit 200 of the image reading device 3. The control unit 200 is composed of a CPU, a storage device for storing programs to be run by the CPU, related parameters, etc., and other devices, and is provided inside the body 31.

The control panel 101 which is an example manipulating means having the touch panel 102 and the manipulation buttons 103 is connected to the control unit 200. The control unit 200 controls a line buffer 201, a skew correction processing unit 202 which is an example second inclination correcting means, an image processing unit 203, the image forming unit 2, a reduction processing unit 204, an edge detection processing unit 205, an angle calculation processing unit 206, etc. A network to which to output image data, an HDD for storing image data, or the like may be employed instead of the image forming unit 2.

Instead of controlling the skew correction processing unit 202, the image processing unit 203, the reduction processing unit 204, the edge detection processing unit 205, the angle calculation processing unit 206, etc., the control unit 200 may be such as to realize the functions of those units. That is, the control unit 200 may be configured so as to operate as the skew correction processing unit 202, the image processing unit 203, the reduction processing unit 204, the edge detection processing unit 205, the angle calculation processing unit 206, etc. according to programs that are stored in a storage means (not shown) in advance.

The line buffer 201 temporarily stores, in units of plural reading lines, image data including data of a document sheet 6 obtained by reading the document sheet 6 by the image reading unit of the image reading device 3, subjecting a resulting signal to prescribed corrections such as a shading correction in an image processing unit (not shown), and converting a resulting signal into digital data (e.g., 8-bit data) with an A/D conversion circuit (not shown). The control unit 200 controls writing and reading of image data to and from the line buffer 201 etc.

The reduction processing unit 204 performs reduction processing on image data of a document sheet 6 as read by the image reading unit of the image reading device 3. For example, the reduction processing unit 204 reduces image data of a document sheet 6 that has been read at a resolution of 600 dpi into data of 150 dpi (¼ of the reading resolution) in the main scanning direction and 75 dpi (⅛ of the reading resolution) in the auxiliary scanning direction. Example algorithms for reducing image data are a projection method and a simple decimation method.

Where input image data consists of image data of plural colors such as R, G, and B, monochromating processing is performed before the reduction processing. Examples of the monochromating processing are a method of using matrix operation values obtained by multiplying individual pixel levels of image data by coefficients and adding resulting values together and a method of selecting image data of a single color.

Figure 16:
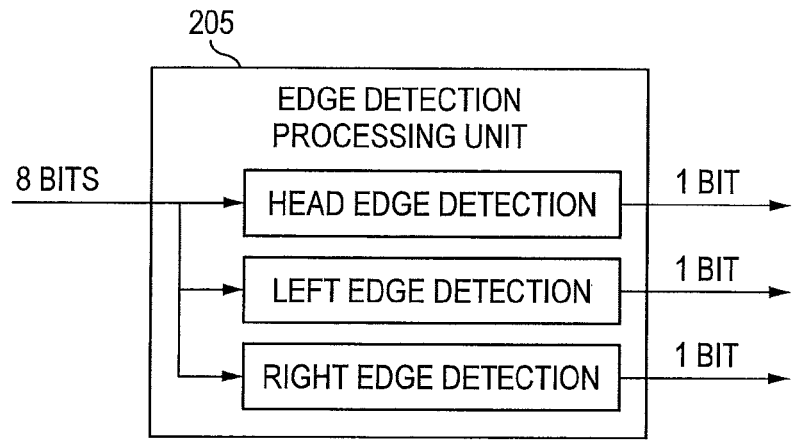
FIG. 16 is a block diagram of an edge detection processing unit.

As shown in FIG. 16, the edge detection processing unit 205 performs, on image data, three kinds of detection processing which are head edge detection, left edge detection, and right edge detection, extracts edge amounts of each side of image information of the read-out document sheet 6, and binarizes the extracted edge amounts using a prescribed threshold value. Thus, the edge detection processing unit 205 outputs, separately, data indicating edge amounts corresponding to respective sets of coordinates (x, y) of each side of the document sheet 6.

Figure 17:
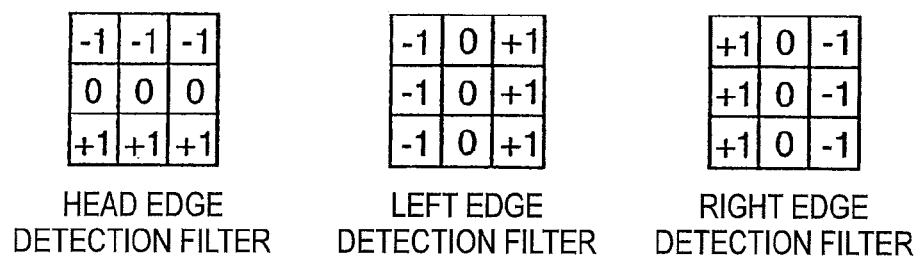
FIG. 17 shows edge detection filters.

The edge detection processing unit 205 extracts edge amounts of each side using three kinds of filters which are a head edge detection filter, a left edge detection filter, and a right edge detection filter which have respective sets of coefficients shown in FIG. 17. In an edge-extracted data, a background image portion (a region outside a document sheet) and a document image portion (a region inside a document sheet) are given values "0" and "1," respectively. Whether the position is located in a background image portion (a region outside a document sheet) and a document sheet image portion (a region inside a document sheet) is judged on the basis of the light quantity of reflection light, that is, whether the reflection light comes from the specular reflection plate 72 or the document sheet 6.

Figure 18:
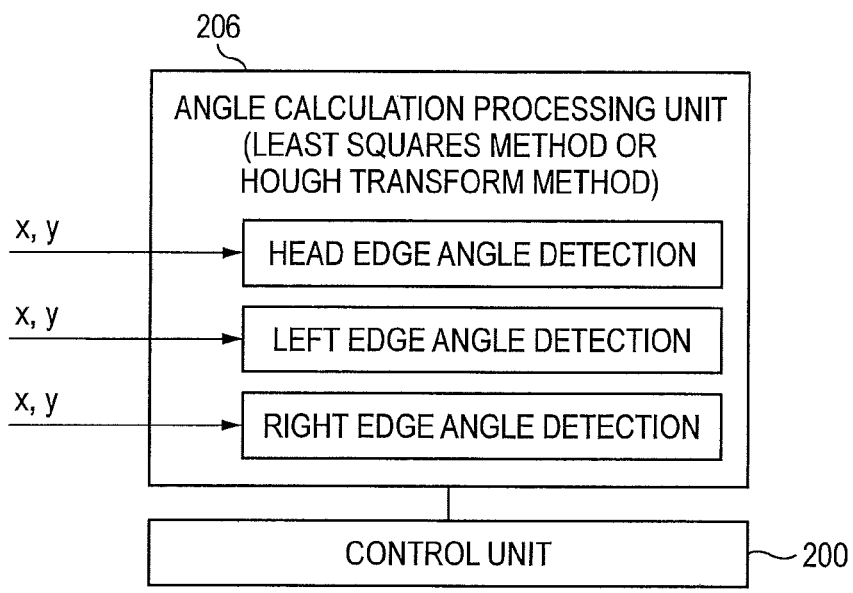
FIG. 18 is a block diagram of an angle calculation processing unit.
Figure 19:
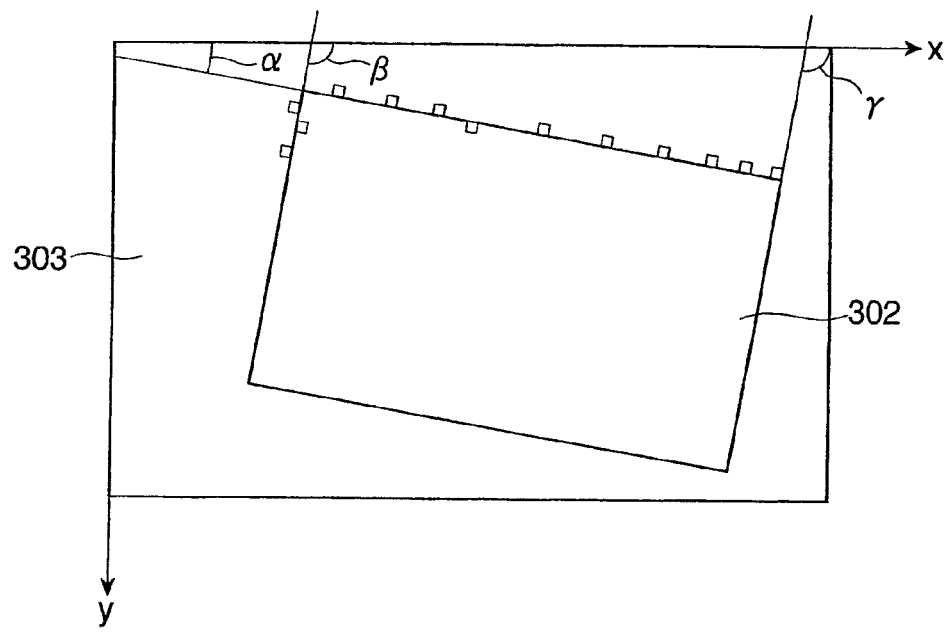
FIG. 19 shows detected sets of coordinates of edges of a document sheet image and inclination angles to be calculated.

As shown in FIGS. 18 and 19, the angle calculation processing unit 206 performs head angle detection, left edge angle detection, and right edge angle detection of calculating inclinations (skew angles) α, β, and γ of the head edge, left edge, and right edge, of a document sheet image 302 on the basis of sets of edge coordinates (x, y) of the respective edges (sides) of the document sheet image 302 detected by the edge detection processing unit 205. Angles of the head edge, left edge, and right edge are calculated by a least squares method, a method using Hough transform, or the like.

Figure 20:
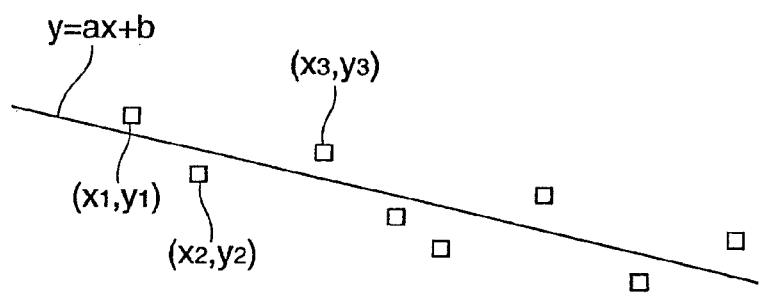
FIG. 20 illustrates how the angle calculation processing unit operates in a case of using a least squares method.
Figure 21:
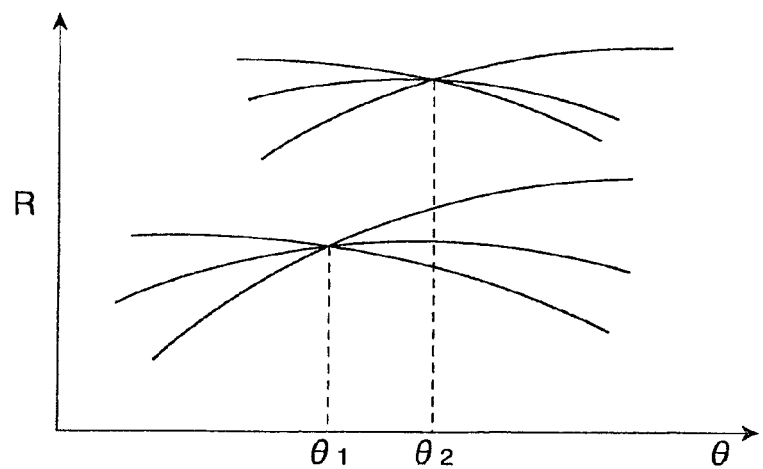
FIG. 21 illustrates how the angle calculation processing unit operates in a case of using Hough transform.

As shown in FIG. 13, document sheets 6 whose images are to be read by the image reading device 3 are restricted in the position in the direction (width direction) that is perpendicular to the conveying direction by edge guides (not shown) of the document sheets housing unit A60. However, a document sheet 6 is not always conveyed with their side edges parallel with the conveying direction and may be inclined from the conveying direction, that is, a certain angle may be formed between them. More specifically, there may occur a case that as shown in FIG. 19 a document sheet 6 is inclined from the conveying direction y, that is, the inclination α of the head edge of the document sheet image 302 obtained by reading the image of the document sheet 6 is not equal to 0° and the inclinations β and γ of the left edge and the right edge are not equal to 90°.

Where a least squares method is used, as shown in FIG. 20, an approximation equation (linear function) y=ax+b by applying the least squares method to the sets of coordinates (x, y) of the edge pixels constituting each side of the document sheet 6 and its inclination a is employed as an angle of the document sheet.

Where Hough transform is used, as shown in FIG. 21, first, Hough transform is performed on the sets of coordinates (x, y) of the edge pixels constituting each side of the document image 302. Voting (counting) is done using a two-dimensional memory having, as inputs, parameters R and θ of a Hough transform equation. This processing is performed on all the sets of pixels of the edge pixels constituting each side of the document image 302. Among the data in the Hough space stored in the two-dimensional memory, data that has acquired a largest number of votes (i.e., a point where most curves corresponding to respective edge pixels intersect each other) is determined and a corresponding θ value ($\theta_1$ or $\theta_2$) is extracted and employed as an inclination angle of the side concerned. In FIG. 21, each curve corresponds to coordinates of each edge pixel. Although in FIG. 21 only two θ values ($\theta_1$ and $\theta_2$) are shown for the sake of convenience, actually inclinations (skew angles) α, β, and γ of the head edge, left edge, and right edge, of the document sheet image 302 are calculated.

After the extraction of the inclination angles of the respective sides of the respective sides, the control unit 200 employs a representative one of these inclination angles as a skew angle of the document sheet 6 and sets it in the skew correction processing unit 202. A representative angle is determined by a method of calculating an average of the inclination angles of the respective sides, a method of employing a most reliable angle, or the like. Where Hough transform is used, a most reliable angle may be an angle having a largest value in the percentage of votes which is given by the following equation:

(percentage of votes)=(votes of determined angle)/(the number of Hough-transformed pixels).

Where the least squares method is used, a most reliable angle may be determined by selecting an angle of a side with smallest errors between the approximation equation and the sets of edge coordinates.

The skew correction processing unit 202 corrects the skew of the document sheet image 302 by rotating the image data of the document sheet 6 stored in the line buffer 201 by an angle corresponding to the skew angle calculated by the angle calculation processing unit 206.

Incidentally, in this exemplary embodiment, the control unit 200 functions as a changing means for changing the manner of correction performed by the second inclination correcting means depending on whether or not the first inclination correcting means has performed a correction operation.

Taking into consideration the processing time that is necessary for skew correction of a document sheet image 302, in the skew correction processing unit 202, ordinarily an upper limit (e.g., ±10°) is set in advance for, for example, skew angles of a document sheet image 302 to be detected by the edge detection processing unit 205. And plural levels (e.g., 10 levels) are set for skew angles of a document sheet image 302 in each of the positive direction and the negative direction with the correction step which is a unit of correction (first unit of correction) set at 10°/10=1°.

The control unit 200 is configured so as to judge whether a skew correction has been performed on the document sheet 6 by the pairs of conveying rolls 63 and 64 and, in causing the skew correction processing unit 202 to perform a skew correction after the skew correction by means of the pairs of conveying rolls 63 and 64, to change the upper limit for skew angles of a document sheet image 302 to be detected by the edge detection processing unit 205 to a second upper limit (e.g., ±5°) which is smaller than the ordinary upper limit and also change the correction step which is a unit of correction to a second unit of correction, that is, 5°/10=0.5° (10 levels are set for skew angles of a document sheet image 302 in each of the positive direction and the negative direction).

Figures 22, 23A, 23B:
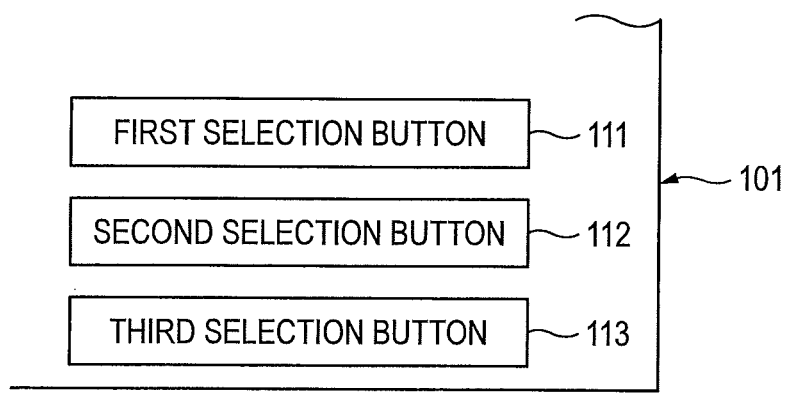
FIG. 22 shows part of a manipulation panel.
FIGS. 23A and 23B show relationships between the document sheet size and the upper limit for skew angles in a second exemplary embodiment of the second aspect of the invention.

Furthermore, in this exemplary embodiment, as shown in FIG. 22, the control panel 101 to be manipulated by a user is equipped with first to third selection buttons 111-113 for selecting only mechanical skew correction, only skew correction by image processing, and both of mechanical skew correction and skew correction by image processing, respectively. The control unit 200 is configured so as to perform a skew correcting operation on a document sheet 6 according to which of the selection buttons 111-113 has been selected by a user.

The image processing unit 203 performs prescribed image processing on the image data of the document sheet 6 that has been subjected to the skew correcting processing in the skew correction processing unit 202, and outputs resulting image data to the exposing device A13 of the image forming unit 2 in synchronism with an image forming operation.

<Operation of Characterizing Part of Image Reading Device>

When the first reading mode has been selected by a user by manipulating the control panel 101, as shown in FIG. 13, in the image reading device 3 document sheets 6 housed in the document sheets housing unit A60 are fed by the feeding roll A61 and separated into individual ones by the pair of separation rolls 62. A resulting document sheet 6 is conveyed by the pairs of conveying rolls 64-66 so as to pass the reading window 71 and is finally ejected to an ejected sheets housing unit 68 by a pair of ejection rolls 69.

In this exemplary embodiment, in selecting the first reading mode by manipulating the control panel 101, a user can make a selection as to whether to perform only a skew correction by image processing or both of a mechanical skew correction and a skew correction by image processing by manipulating the selection buttons 111-113. More specifically, the image reading device 3 is configured so as to perform only a mechanical skew correction if the selection button 111 is manipulated, only a skew correction by image processing if the selection button 112 is manipulated, and both of a mechanical skew correction and a skew correction by image processing if the selection button 113 is manipulated.

As a document 6 passes the reading position corresponding to the reading window 71, a document sheet 6 is illuminated with light emitted from the illumination lamp 78 and light reflected from the reflector 79. And light reflected from the document sheet 6 and the background member (specular reflection plate 72) is reflected by the first to third mirrors 80-82, imaged on the image reading element 83 by the lens 84, and read by the image reading element 83. The image reading element 83 outputs image data corresponding to the light reflected from the document sheet 6 and the background member.

The image data of the document sheet 6 that has been generated by the image reading device 3 is supplied to the line buffer 201 (see FIG. 15) and stored there temporarily, and is also supplied to the reduction processing unit 204 and subjected to reduction processing there.

Reduced image data generated by the reduction processing unit 204 is input to the edge detection processing unit 205. As shown in FIGS. 16 and 17, the edge detection processing unit 205 detects boundaries between a background image 303 and a head portion, a left end portion, and a right end portion of a document (i.e., edges of the sheet image 302) using the three kinds of filters.

Data of the head edge, left edge, and right edge of the document sheet image 302 detected by the edge detection processing unit 205 are supplied to the angle calculation processing unit 206. As shown in FIGS. 19-21, the angle calculation processing unit 206 calculates inclination angles $\alpha$, $\beta$, and $\gamma$ of the head edge, left edge, and right edge of the document sheet image 302 on the basis of the data of the head edge, left edge, and right edge according to the least squares method, the Hough transform method, or the like.

In the image reading device 3 according to this exemplary embodiment, a selection as to whether to perform only a mechanical skew correction, only a skew correction by image processing, and both of a mechanical skew correction and a skew correction by image processing can be made by manipulating one of the selection buttons 111-113 of the control panel 101 before a start of a reading operation on a document sheet 6.

If a user selects execution of only a mechanical skew correction, the control unit 200 causes only a mechanical skew correction to be performed by the pairs of conveying rolls 63 and 64 while the document sheet 6 is conveyed and does not cause the skew correction processing unit 202 to perform a skew correction.

If the user selects execution of only a skew correction by image processing, the control unit 200 does not cause the pairs of conveying rolls 63 and 64 to perform a mechanical skew correction while the document sheet 6 is conveyed and causes only a skew correction to be performed by the skew correction processing unit 202. In this case, the skew correction processing unit 202 performs ordinary skew correction processing.

If the user selects execution of both of a mechanical skew correction and a skew correction by image processing, the control unit 200 causes the pairs of conveying rolls 63 and 64 to perform a mechanical skew correction while the document sheet 6 is conveyed and thereafter causes the skew correction processing unit 202 to perform a skew correction.

In this case, the control unit 200 changes the manner of skew correction processing of the skew correction processing unit 202 from those of skew correction processing that is performed by the skew correction processing unit 202 when only a skew correction by image processing is performed.

More specifically, in causing the skew correction processing unit 202 to perform a skew correction, the control unit 200 changes the upper limit for skew angles of a document sheet image 302 to be detected by the edge detection processing unit 205 to the second upper limit (e.g., ±5°) which is smaller than the ordinary upper limit and also changes the correction step which is a unit of correction to the second unit of correction, that is, 5°/10=0.5° (10 levels are set for skew angles of a document sheet image 302 in each of the positive direction and the negative direction). It is noted that ordinarily the upper limit for skew angles of a document sheet image 302 to be detected by the edge detection processing unit 205 is set at, for example, ±10° and the correction step which is a unit of correction (first unit of correction) is set at 10°/10=1°.

Therefore, if the skew angle α of a head edge of a document sheet 6 calculated by the angle calculation processing unit 206 is equal to 3.5°, the control unit 200 sets at 0.5° the correction step of skew correction to be performed on a document sheet image 302 by the skew correction processing unit 202 and causes the skew correction processing unit 202 to perform rotation processing on the document sheet image 302 that that the skew angle of the head edge of the document sheet 6 is corrected to 0°.

Therefore, in this exemplary embodiment, since the upper limit for skew angles of a document sheet image 302 to be set in the skew correction processing unit 202 to the second upper limit (e.g., ±5°) which is smaller than the ordinary upper limit with the number of correction levels kept at 10, the correction step of a skew correction which is performed on a document sheet image 302 by the skew correction processing unit 202 can be reduced to 0.5°. Thus, the accuracy of a skew correction which is performed on a document sheet image 302 by image processing can be increased.

Furthermore, since the number of correction levels of a skew correction which is performed on a document sheet image 302 by the skew correction processing unit 202 is kept at 10, the time required for correction processing can be prevented from becoming unduly long.

In contrast, in a conventional case, if skew correction by image processing is selected, the upper limit for skew angles of a document sheet image 302 to be detected by the edge detection processing unit 205 is kept at the ordinary value (e.g., ±10°) irrespective of whether a mechanical skew correction is also to be performed or not. Therefore, the correction step of a skew correction which is performed on a document sheet image 302 by the skew correction processing unit 202 remains 1.0° (first unit of correction). If the skew angle α of a head edge of a document sheet 6 is equal to 3.5°, the skew angle α of the head edge of the document sheet 6 can only be corrected to 0.5° or −0.5°, which means an error of ±0.5°.

The control unit 200 which is an example changing means may be configured so as to cause a correction operation by image processing if a mechanical skew correcting operation is also performed and does not cause a correction operation by image processing if a mechanical skew correcting operation is not performed. If a document sheet 6 is conveyed without a mechanical skew correction, it may be read with a skew that is out of a correction range of skew correction by image processing. If a skew correction by image processing performed in this case, part of an image obtained by reading the document sheet 6 may be lost. For example, if a skew correction by image processing is performed on an image having an inclination angle 3° with a unit of correction of 0.5°, part of the image may be lost. In view of this, it is desirable to abstain from performing a correction operation by image processing (i.e., to change the setting so) if no mechanical skew correcting operation is performed.

Exemplary Embodiment 2

FIGS. 23A and 23B illustrate a second exemplary embodiment of the second aspect of the invention. The same units etc. as in the first exemplary embodiment will be given the same reference symbols as in the first exemplary embodiment. The second exemplary embodiment is provided with detecting means for detecting a size of document sheets 6 and a changing means for changing the manner of correction performed by the second inclination correcting means according to a detection result of the detecting means.

More specifically, as shown in FIG. 13, the image reading device 3 according to the second exemplary embodiment is equipped with the first sensor 73 which is an example detecting means for detecting a size, in the auxiliary scanning direction, of document sheets 6 housed in the document sheets housing unit A60 of the automatic document feeding unit 33 and the second sensor 74 which is an example detecting means for detecting a size of the document sheets 6 in the main scanning direction.

The control unit 200 judges, on the basis of output signals of the first sensor 73 and the second sensor 74, whether document sheets 6 are of a regular size such as A4, A3, or B5, of an irregular size such as the letter size, size-mixed document sheets of plural sizes such as A4 and A3, or of a long size such as an extended A3 size. It is expected that with the first sensor 73 and the second sensor 74 it cannot be judged whether document sheets 6 are of a regular size or size-mixed ones. However, it is possible to cope with such a situation by employing a third detecting means for detecting a size of a document sheet 6 being conveyed. A user may set, through a user setting picture, whether document sheets 6 are of a regular size, an irregular size, mixed sizes, of a long size, or another size.

After judging a size of the document sheets 6 on the basis of output signals of the first sensor 73 and the second sensor 74, the control unit 200 changes the manner of a skew correction to be performed on a document image 302 by the skew correction processing unit 202 by referring to a table as shown in FIG. 23A.

More specifically, if judging that the document sheets 6 are of a regular size or an irregular size and are of neither a long size nor mixed sizes, the control unit 200 changes the upper limit for skew angles of a document sheet image 302 to be detected by the edge detection processing unit 205 to the second upper limit (e.g., ±5°) which is smaller than the ordinary value while keeping at 10 the number of correction steps which is a factor in determining a correction step (unit of correction).

On the other hand, if judging that the document sheets 6 are of a long size or mixed sizes, the control unit 200 sets the upper limit for skew angles of a document sheet image 302 to be detected by the edge detection processing unit 205 at the ordinary value (e.g., ±10°) while keeping the number of correction steps at 10.

As described above, by changing the manner of a skew correcting operation to be performed by the skew correction processing unit 202 on a document sheet image 302 on the basis of a size of document sheets 6, the control unit 200 can set the correction step (unit of correction) at 0.5° (second unit of correction) which is smaller than the ordinary, first unit of correction and thereby increase the accuracy of correction of a document sheet image.

Alternatively, as shown in FIG. 23B, the control unit 200 may be configured so that the angle of skew correction which is performed by the skew correction processing unit 202 on a document sheet image 302 is switched between three or more values (e.g., 15°, 10°, and 5°) according to the size of document sheets 6. In this case, where the number of correction levels is kept at 10, the unit of correction can be switched between 1.5°, 0.1°, and 0.5°

If judging that document sheets 6 are of a long size or mixed sizes, the control unit 200 sets the upper limit for skew angles of a document sheet image 302 at the ordinary value (e.g., ±10°) and sets the correction step (unit of correction) equal to 1.0° (ordinary value). Thus, skew correction by image processing can also be performed on document sheets 6 having a long size or mixed sizes.

Although in the above exemplary embodiment a mechanical skew correction on a document sheet 6 is performed using both of the pair of conveying rolls 63 and the pair of conveying rolls 64, it may be performed using only one of the pair of conveying rolls 63 and the pair of conveying rolls 64.

If a size of document sheets 6 cannot be judged, it is preferable that the control unit 200 change the correction step of skew correction by image processing on a document sheet image 302 to a relatively large value.

An exemplary embodiment of the third aspect of the invention will be described below. The descriptions that have been made with reference to FIGS. 1-3 in the first aspect of the invention are also applicable to the third aspect of the invention and hence are omitted here.

Figure 24:
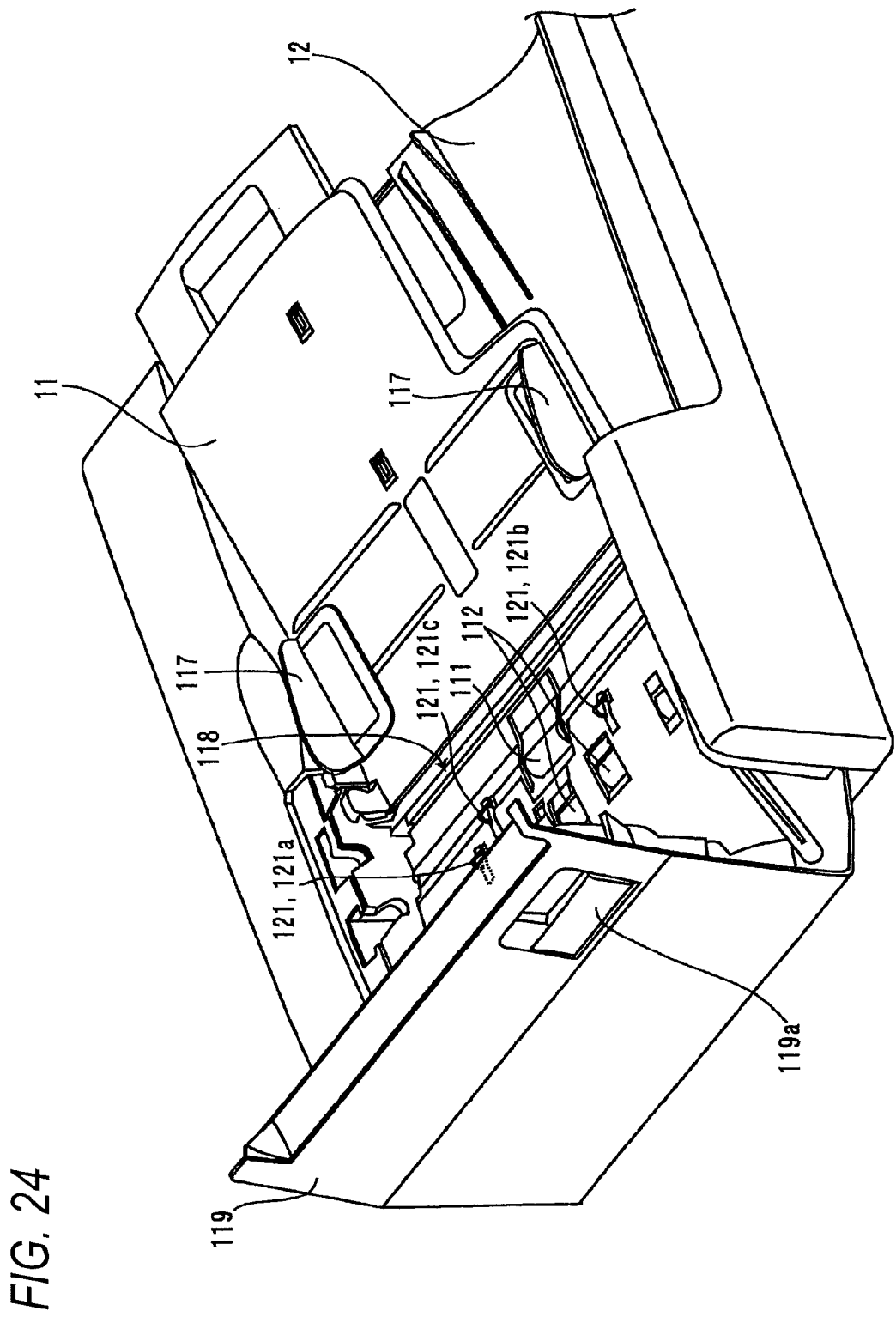
FIG. 24 is a perspective view showing the internal structure of a top part of a cover unit used in an exemplary embodiment of a third aspect of the invention in a state that an openable cover is opened.

FIG. 24 is a perspective view showing the internal structure of a top part of the cover unit which is in a state that the openable cover 119 located over the document carry-in inlet 118 is opened.

A first roll 111 and three first sensors 121 are disposed immediately downstream of the document carry-in inlet 118 (also see FIG. 3). The first roll 111 is a roll which acts first on the document sheets placed on the document tray 11 to feed them one by one.

The three first sensors 121 serve to detect feeding (arrival) of a document sheet and its posture. The three first sensors 121 are first sensors 121a and 121b disposed at two respective side positions and a first sensor 121c disposed between the first sensors 121a and 121b. The interposed first sensor 121c is located closer to the document carry-in inlet 118 than the side first sensors 121a and 121b, and serves as a sensor for detecting, first, a document sheet that has been fed by the first roll 111. Each of the three first sensors 121 is a sensor which falls down being pushed by a head portion of a document sheet that is fed by the first roll 111 and detects its own falling-down.

An inclination angle of a document sheet that is passing the three first sensors 121 is detected on the basis of the difference between times that elapse from detection of the document sheet by the upstream first sensor 121c to events of detection of the document sheet by the respective side first sensors 121a and 121b. For example, assume that after detection of a document sheet by the upstream first sensor 121c the first sensor 121b detects the document sheet later than the first sensor 121a. The first sensor 121a is close to the first sensor 121c. Therefore, to simplify the description, the difference between their positions in the width direction is disregarded. A conveyance speed of the document sheet is detected on the basis of the difference between times when it is detected by the respective first sensors 121c and 121a. An inclination direction and an inclination angle of the document sheet are detected on the basis of the difference between times when it is detected by the respective first sensors 121a and 121b.

Second rolls 112 are disposed downstream of the first roll 111 and the first sensors 121, and second sensors 122 are disposed downstream of the second rolls 112. The second rolls 112 are rolls for correcting inclination of a document sheet that is fed by the first roll 111 and feeding it further downstream. Each second sensor 122 is a sensor which, like each first sensor 121, falls down being pushed by a head portion of a document sheet and detects its own falling-down.

The plural second sensors 122 are arranged in the width direction of document sheets. The plural second sensors 122 are arranged in the width direction of a document sheet. The second sensors 122 are sensors which not only detect that a document sheet has been conveyed past the second rolls 112 but also detect a width of the document sheet (e.g., A4 portrait) on the basis of which of them have detected the document sheet.

FIG. 5 illustrates how the image reading device 10 shown in FIGS. 1 and 2 operate. FIGS. 6A-6D illustrate details of image inclination correction processing. FIG. 7 shows a correction mode switching setting picture 80. FIG. 8 shows a long document setting button 91. The descriptions that have been made with reference to FIGS. 5-8 in the first aspect of the invention are also applicable to the third aspect of the invention and hence are omitted here.

Figures 26, 27:
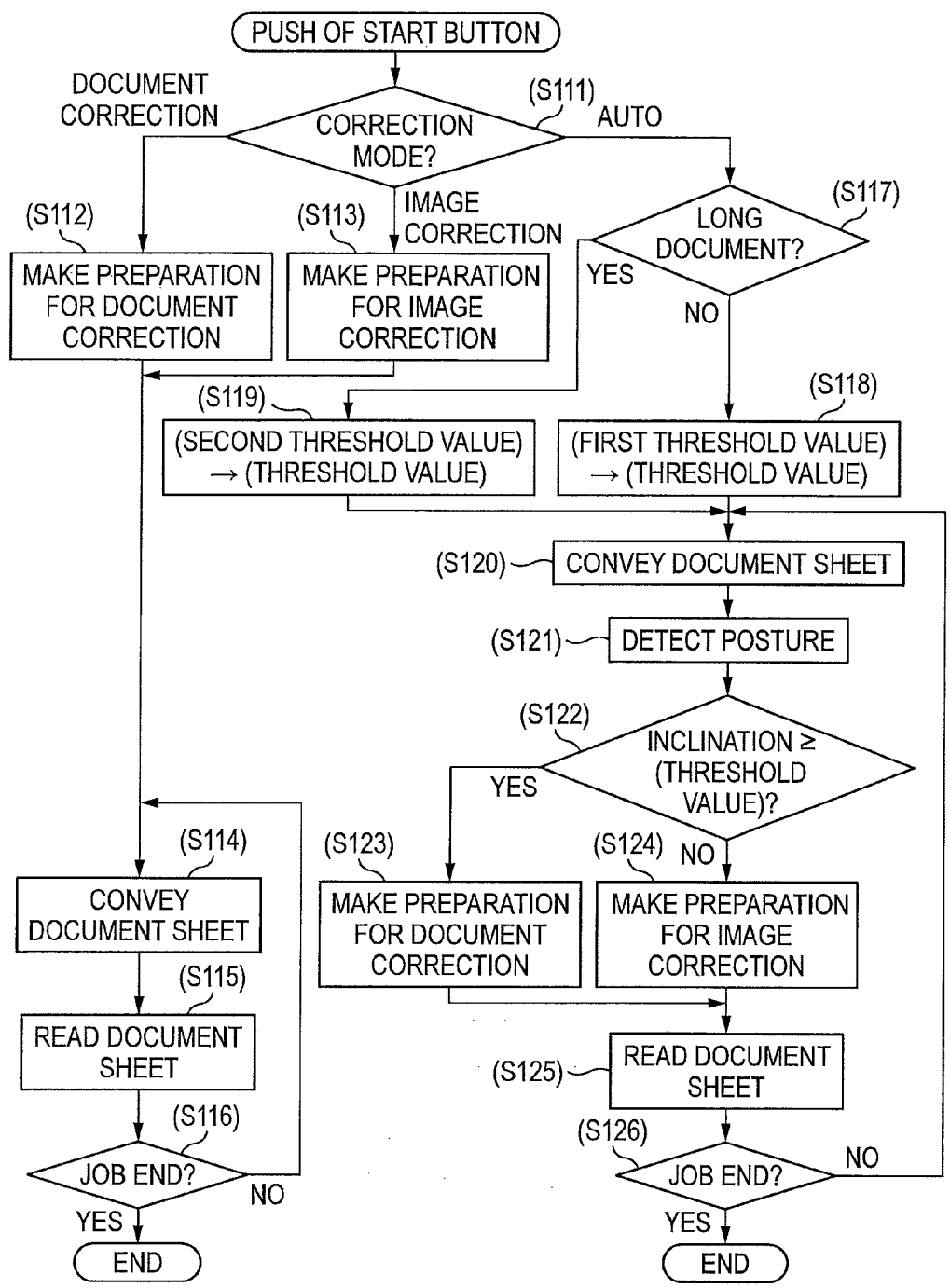
FIG. 26 is a flowchart of a second example process that is executed by the image reading device of the multifunction machine according to the exemplary embodiment of the third aspect of the invention.
FIG. 27 shows a size-mixed document setting button.

FIG. 26 is a flowchart of a first example process that is executed by the image reading device 10 of the multifunction machine 1 according to this exemplary embodiment when the start button 611 is pushed.

When the start button 611 shown in FIG. 3 is pushed, first, at step S111, it is judged whether the correction mode that is stored in a storage unit (not shown) provided in the circuit unit 70 (see FIG. 2) is the document correction mode, the image correction mode, or the automatic correction mode. If the correction mode is the document correction mode, at step S112 a preparation for document inclination correction according to the first correction mode is made. If the correction mode is the image correction mode, at step S113 a preparation for image inclination correction according to the second correction mode is made. After the execution of step S112 or S113, step S114 (document sheet conveyance) and step S115 (document sheet reading) are executed repeatedly until completion of the current job (step S116).

If it is judged at step S111 that the correction mode is the automatic correction mode, the process moves to step S117, where it is judged whether the current document sheets are long document sheets (see FIG. 8). If the current document sheets are not long document sheets but ordinary-length document sheets, at step S118 a first threshold value is set as a threshold value to be used for judgment to be made at a later step S122. On the other hand, if the current document sheets are long document sheets, at step S119 a second threshold value which is smaller than the first threshold value is set as a threshold value to be used for judgment at step S122.

The reason why a smaller threshold value is set for long document sheets is that it is expected that because of its great length a long document sheet will suffer a larger lateral deviation while being conveyed than document sheets having ordinary lengths.

At step S120, conveyance of the first one of the document sheet placed on the document tray 11 (see FIGS. 3 and 24) is started. At step S121, a posture of the document sheet is detected by the first sensors 121 in the manner described above with reference to FIG. 24. At step S122, it is judged whether the inclination that represents the posture is larger than or equal to the threshold value that was set at step S118 or S119. If the inclination of the document sheet is larger than or equal to the threshold value, at step S123 a preparation for document inclination correction according to the first correction mode is made. The document inclination correction according to the first correction mode generates a relatively large sound of document sheet conveyance which may be harsh on the ears. However, if a document sheet is inclined to a large extent, the inclination may not be able to be corrected properly by image processing. Therefore, document inclination correction is employed here. On the other hand, if it is judged that the inclination of the document sheet is smaller than threshold value, at step S124 a preparation for image inclination correction according to the second correction mode which is performed on the basis of an image signal obtained by reading is made. The sound of document sheet conveyance that is generated during an image inclination correction is smaller than during a document inclination correction. Image inclination correction is employed here because the inclination angle is small and hence the image inclination can be corrected properly by an image inclination correction.

The first document sheet which started to be conveyed at step S120 is read at step S125. Step S127 (document sheet conveyance) and step S128 (document sheet reading) are executed repeatedly until completion of the current job (step S126).

FIG. 26 is a flowchart of a second example process which is executed by the image reading device 10 when the start button 611 is pushed.

Figure 25:
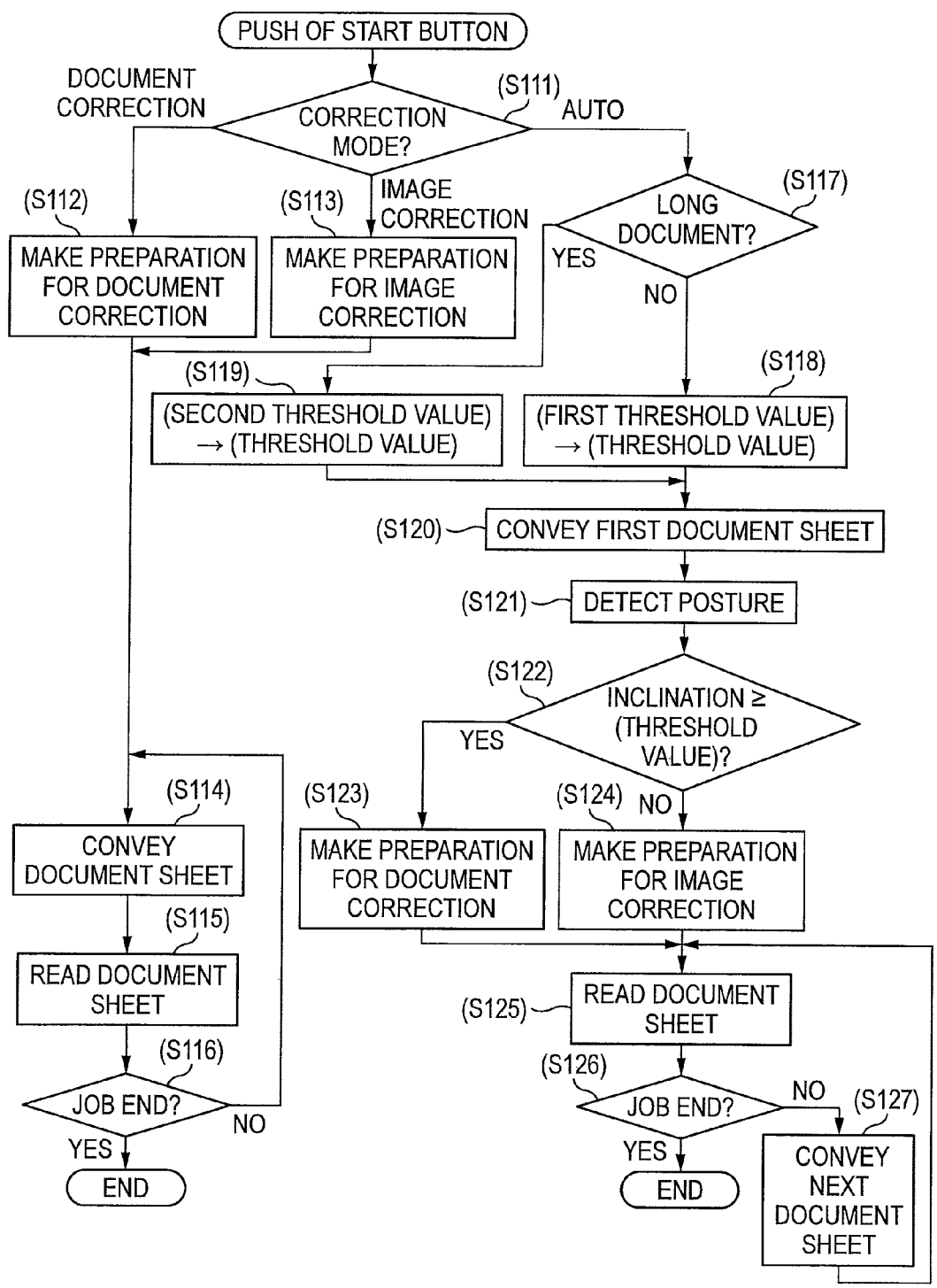
FIG. 25 is a flowchart of a first example process that is executed by an image reading device of a multifunction machine according to the exemplary embodiment of the third aspect of the invention.

In the first example process shown in FIG. 25, an inclination correction method for all document sheets of a job is determined on the basis of an inclination of the first document sheet of the job.

In contrast, in the second example process shown in FIG. 26, if automatic correction mode was set by correction mode setting (see FIG. 7), a posture of each document sheet is detected and the inclination correction method is switched accordingly. For example, when plural document sheets of a job having different sizes are read, the posture may vary from one document sheet to another. The second example process is effective at allowing reading of size-mixed document sheets. However, when the second example process shown in FIG. 26 is executed, it is not necessary to set in advance that the subject document sheets are size-mixed document sheets.

In the description of the second example process shown in FIG. 26, steps having the same ones in the first example process shown in FIG. 25 will be given the reference symbols as the latter. Only differences from the first example process will be described.

Step S120 of the first example process shown in FIG. 25 and step S120 of the second example process shown in FIG. 26 are the same in terms of document sheet conveyance. However, whereas only the first document sheet is conveyed at step S120 of the first example process shown in FIG. 25, step S120 of the second example process shown in FIG. 26 serves to convey the document sheets of the job sequentially.

Furthermore, in the first example process shown in FIG. 25, if it is judged at step S126 that the job has not completed yet, the process returns to step S127 to convey the next document sheet. This document sheet is read at step S126. In contrast, in the second example process shown in FIG. 26, if it is judged at step S126 that the job has not completed yet, the process returns to step S120 to start conveyance of the next document sheet. A posture of the document sheet is detected at step S121 and a preparation for document inclination correction or image inclination correction is made at step S123 or S124. That is, in the second example process shown in FIG. 26, switching is made between document inclination correction and image inclination correction on a document sheet by document sheet basis in the same job.

The second example process shown in FIG. 26 is different from the first example process shown in FIG. 25 in the above-described points. As mentioned above, the second example process shown in FIG. 26 is suitable for an image reading device that allows use of size-mixed document sheets.

Next, a description will be made of a third example process shown in FIG. 28. In the above-described second example process shown in FIG. 26 which is suitable for the case of allowing use of size-mixed document sheets, it is not necessary to set in advance that the document sheets of the current job are size-mixed document sheets. In contrast, in the third example process to be described below, it is necessary to set in the image reading device 10 in advance that the document sheets of the current job are size-mixed document sheets (i.e., size-mixed document mode).

FIG. 27 shows a size-mixed document setting button 92. To have the image reading device 10 read size-mixed document sheets having plural sizes, a user pushes the size-mixed document setting button 92 shown in FIG. 27 and sets the reading mode to the size-mixed document mode. Like the long document mode (see FIG. 8), the size-mixed document mode is set for each reading job prior to reading of document sheets. Upon completion of the reading of the document sheets of the job, the setting of the size-mixed document mode is canceled and the reading mode is returned to the mode for reading a stack of document sheets having the same size.

Although in the above example the size-mixed document mode is set by pushing the size-mixed document setting button 92 (see in FIG. 27) which is displayed on the touch panel 613, as in the case of the long document setting button a physical size-mixed document setting button may be provided as one button of the user interface 61 shown in FIG. 3.

Figure 28:
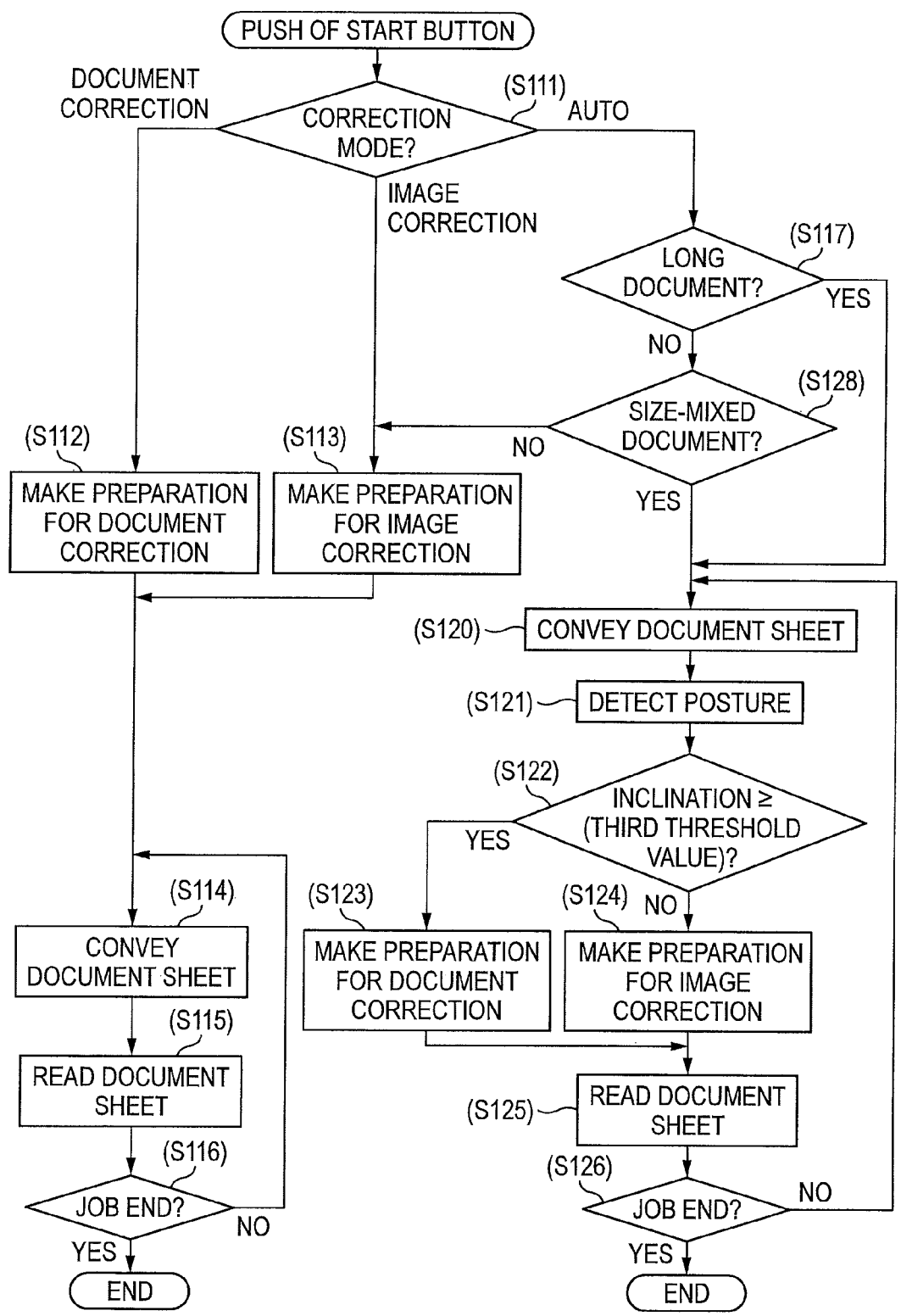
FIG. 28 is a flowchart of a third example process that is executed by the image reading device of the multifunction machine according to the exemplary embodiment of the third aspect of the invention.

FIG. 28 is a flowchart of the third example process which is executed by the image reading device 10 when the start button 611 is pushed.

Unlike the above-described first and second example processes, the third example process shown in FIG. 28 is intended for a case that the image reading device 10 has large margins in the document reading width in the document sheet width direction and the capacity of the memory for storing image data produced by reading a document sheet. That is, in the third example process, it is assumed that by virtue of the large margins in document reading width and memory capacity the image inclination correction can always be employed when subject document sheets are neither long document sheets nor size-mixed document sheets and have the same, ordinary size.

In the description of the third example process shown in FIG. 28, steps having the same ones in the first example process shown in FIG. 25 or the second example process shown in FIG. 26 will be given the reference symbols as the latter. Only differences from the first and second example processes will be described.

In the third example process shown in FIG. 28, if the judgment result of step S117 (the judgment as to whether the current document sheets are long document sheets) is negative, then it is judged at step S128 whether the current document sheets are size-mixed document sheets or not. If the current document sheets are neither long document sheets (S117: no) nor size-mixed document sheets (S128: no), that is, if document sheets having the same, ordinary size are to be read, the process moves to step S113, where a preparation for image inclination correction according to the second correction mode is made. Thus, where the third example process is executed, because of the large margins in document reading width, memory capacity, etc., the image reading device 10 can read document sheets while generating a smaller sound than in the case where the first or second example process is executed.

If the current document sheets are long document sheets (S117: yes) or size-mixed document sheets (S128: yes), step S121 (posture detection) and steps S122-S124 (switching of the inclination correction method) are executed every time a document sheet is conveyed at step S120.

It is judged at step S122 whether the inclination is larger than or equal to a third threshold value. The third threshold value need not always be equal to the first or second threshold value used in the first and second example processes and is a threshold value that is suitable for the image reading device 10 that employs the third example process. The third example process shown in FIG. 28 is different from the first and second example processes in the above-described points.

Although each of the first to third examples processes is directed to the case that the long document mode is provided, the third aspect of the invention can also be applied to image reading devices in which long document sheets are not read or whether the current document sheets are long document sheets or not is irrelevant. In this case, setting of the long document mode (see FIG. 8) and step S117 of judging whether the reading mode is the long document mode (see FIGS. 25, 26, and 28) are omitted.

Although the third example process is directed to the case that the size-mixed document mode is provided, the third example process can also be applied to image reading devices that are not provided with the size-mixed document mode. In this case, setting of the size-mixed document mode and step S128 of the third example process shown in FIG. 28 are omitted. If it is judged at step S117 that current the document sheets are not long document sheets, the process moves to step S113, where a preparation for image inclination correction is made.

The third aspect of the invention can also be applied to image reading devices in which neither long document sheets nor size-mixed document sheets are read or whether the current document sheets are long document sheets or size-mixed document sheets is irrelevant. In this case, the third example process shown in FIG. 28 is not employed.

Furthermore, the multifunction machine including the example image reading device and the example copier according to the third aspect of the invention has been described above, the third aspect of the invention can also be applied to single-function image reading devices and copiers.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image reading device comprising:
   a placement stage on which document sheets bearing respective images are placed;
   a pair of guide members that hold the document sheets placed on the placement stage between them and guide a document sheet when it is conveyed, at least one of the pair of guide members being movable in a width direction that is perpendicular to a conveying direction of the document sheets placed on the placement stage;
   an interval-between-guide-members detecting unit that detects an interval between the pair of guide members;
   a document sheet conveying unit that conveys the document sheets placed on the placement stage sequentially one by one and thereby causes the document sheets to pass a reading position;
   a document reading unit that generates an image signal by reading the image on a document that is passing the reading position;
   a first inclination correction unit that is disposed upstream of the reading position in the direction of document conveyance by the document sheet conveying unit and corrects inclination of a document sheet brought by conveyance when hit by a front portion of the document sheet; and
   a correction mode switching control unit that switches to a first inclination correction mode in which the first inclination correction unit operates if the interval between the pair of guide members that are holding the document sheets placed on the placement stage between them is larger than or equal to a predetermined first threshold value, and to a second inclination correction mode in which the first inclination correction unit does not operate if the interval between the pair of guide members is smaller than the first threshold value.

2. The image reading device according to claim 1, wherein
the image reading device is provided with a size-mixed document mode in which the interval between the pair of guide members is set to a value corresponding to a maximum width of widths of document sheets placed on the placement stage and having plural sizes within the maximum width and the document sheets placed on the placement stage are read;
the image reading device further comprises a document width detection unit that is disposed upstream of the first inclination correction unit in the document conveying direction and detects a width of a document sheet brought by conveyance; and
in the size-mixed document mode the correction mode switching control unit switches to the second inclination correction mode if the width of a document sheet detected by the document width detection unit is smaller than the first threshold value even if the interval between the pair of guide members detected by the interval-between-guide-members detecting unit is larger than or equal to the first threshold value.

3. The image reading device according to claim 1, wherein:
the image reading device is provided with a long document mode in which document sheets that are longer than a predetermined length in the document conveying direction are read; and
in the long document mode the correction mode switching control unit switches between the first inclination correction mode and the second inclination correction mode using, in place of the first threshold value, a second threshold value that is smaller than the first threshold value.

4. The image reading device according to claim 1, wherein:
the image reading device is provided with a long document mode in which document sheets that are longer than a predetermined length in the document conveying direction are read; and
in a reading mode other than the long document mode the correction mode switching control unit fixes an inclination correction mode to the second inclination correction mode.

5. The image reading device according to claim 1, wherein:
the image reading device further comprises a second inclination correction unit that calculates, on the basis of the image signal generated by the document reading unit, an inclination amount of an image represented by the image signal and generates a new image signal representing an inclination-corrected image in accordance with the calculated inclination amount; and the correction mode switching control unit switches to one of inclination correction by the first inclination correction unit and inclination correction by the second inclination correction unit.

6. A copier comprising:
the image reading device according to claim 1; and
an image forming apparatus that forms, on a sheet, an image on the basis of the image signal generated by the image reading device.

7. An image reading device comprising:
an image reading unit that reads images on respective document sheets as they are conveyed individually;
a first correcting unit that mechanically corrects inclination of the document sheet from a conveying direction;
a second correcting unit that corrects for inclination of the document sheet by image processing; and
a changing unit that changes the manner of correction of the second correcting unit in accordance with whether the first correcting unit performs an inclination correction,
wherein:
the second correcting unit is provided with a first unit and a second unit as units of correction to be used when it performs an inclination correction; and
the changing unit changes the unit of correction to the first unit if the first correcting unit performs an inclination correction, and to the second unit if the first correcting unit does not perform an inclination correction.

8. The image reading device according to claim 7, wherein the changing unit causes the second correcting unit to perform an inclination correction if the first correcting unit performs an inclination correction, and causes the second correcting unit not to perform an inclination correction if the first correcting unit does not perform an inclination correction.

9. The image reading device according to claim 7, wherein in case where the document sheets are long document sheets or size-mixed document sheets, the changing unit causes the second correcting unit to perform an inclination correction if the first correcting unit performs an inclination correction, and causes the second correcting unit not to perform an inclination correction if the first correcting unit does not perform an inclination correction.

10. The image reading device according to claim 7, wherein in case where the document sheets are long document sheets or size-mixed document sheets, the changing unit changes the unit of correction to the second unit.

11. The image reading device according to claim 7, wherein the changing unit changes the unit of correction to a larger value when the document sheets are long document sheets than when the document sheets are size-mixed document sheets.

12. An image reading device comprising:
an image reading unit that reads images on respective document sheets as they are conveyed individually;
a first correcting unit that mechanically corrects inclination of the document sheet from a conveying direction;
a second correcting unit that corrects for inclination of the document sheet by image processing; and
a changing unit that changes the manner of correction of the second correcting unit in accordance with whether the first correcting unit performs an inclination correction,
wherein:
the image reading device further comprises a detecting unit that detects a size of a document sheet; and the changing unit changes the manner of correction of the second correcting unit in accordance with whether the first correcting unit performs an inclination correction and a detection result of the detecting unit.

13. The image reading device according to claim 7, wherein the image reading device further comprises a stopping unit that stops operation of the changing unit if a user commands a stop of operation of the changing unit.

14. An image forming apparatus comprising:
the image reading device according to claim 7; and
an image forming unit that forms, on a recording medium, an image on the basis of an image signal generated by the image reading device.

15. An image reading device comprising:
a placement stage on which document sheets bearing respective images are placed;
a document sheet conveying unit that conveys the document sheets placed on the placement stage in a conveying direction sequentially one by one and thereby causes the document sheets to pass a reading position;
a document reading unit that generates an image signal by reading the image on a document that is passing the reading position;
a first inclination correction unit that is disposed upstream of the reading position in the conveying direction and corrects inclination of a document sheet brought by conveyance when hit by a front portion of the document sheet;
a correction mode switching control unit that switches between a first inclination correction mode in which the first inclination correction unit operates and a second mode inclination correction mode in which the first inclination correction unit does not operate; and
a document sheet posture detecting unit that is disposed upstream of the first inclination correction unit in the conveying direction and detects a posture of a document sheet that has been conveyed from the placement stage,
wherein the correction mode switching control unit switches to the first inclination correction mode if the document sheet posture detecting unit detects that the document sheet that has been conveyed from the placement stage has an inclination amount that is larger than or equal to a predetermined first threshold value, and to the second inclination correction mode if the document sheet posture detecting unit detects that the document sheet that has been conveyed from the placement stage has an inclination amount that is smaller than the first threshold value.

16. The image reading device according to claim 15, wherein:
the document sheet posture detecting unit is to detect a posture of a document sheet that is conveyed first from the placement stage; and
the correction mode switching control unit maintains, until completion of reading of all of the document sheets placed on the placement stage, the first inclination correction mode or the second inclination correction mode to which switching is made in accordance with the detected inclination amount of the first document sheet.

17. The image reading device according to claim 15, wherein:
the document sheet posture detecting unit is to detect a posture of every document sheet that is conveyed from the placement stage; and
the correction mode switching control unit switches between the first inclination correction mode and the second inclination correction mode in accordance with an inclination amount of the document sheet every time one document sheet is conveyed from the placement stage.

18. The image reading device according claim 15, wherein:
the image reading device is provided with a long document mode in which document sheets that are longer than a predetermined length in the conveying direction are read; and
in the long document mode the correction mode switching control unit switches between the first inclination correction mode and the second inclination correction mode in accordance with whether the document sheet posture detecting unit detects that the document sheet that has been conveyed from the placement stage has an inclination amount that is larger than or equal to a second threshold value that is smaller than the first threshold value, rather than the first threshold value.

19. The image reading device according to claim 15, wherein:
the image reading device is provided with a long document mode in which document sheets that are longer than a predetermined length in the document conveying direction are read; and
in a reading mode other than the long document mode the correction mode switching control unit fixes an inclination correction mode to the second inclination correction mode.

20. The image reading device according to claim 15, wherein:
the image reading device further comprises a second inclination correction unit that calculates, on the basis of the image signal generated by the document reading unit, an inclination amount of an image represented by the image signal and generates a new image signal representing an inclination-corrected image in accordance with the calculated inclination amount; and
the correction mode switching control unit switches to one of inclination correction by the first inclination correction unit and inclination correction by the second inclination correction unit.

21. A copier comprising:
the image reading device according to claim 15; and
an image forming apparatus that forms, on a sheet, an image on the basis of the image signal generated by the image reading device.

* * * * *